US012634890B2

(12) United States Patent
Selvanesan et al.

(10) Patent No.: US 12,634,890 B2
(45) Date of Patent: May 19, 2026

(54) TIMING ASPECTS FOR NR SL ASSISTANCE INFORMATION MESSAGES

(71) Applicant: KONINKLIJKE PHILIPS N.V., Eindhoven (NL)

(72) Inventors: Sarun Selvanesan, Berlin (DE); Baris Göktepe, Berlin (DE); Thomas Fehrenbach, Berlin (DE); Thomas Wirth, Berlin (DE); Cornelius Hellge, Berlin (DE); Thomas Schierl, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 413 days.

(21) Appl. No.: 18/026,855

(22) PCT Filed: Sep. 15, 2021

(86) PCT No.: PCT/EP2021/075373
§ 371 (c)(1),
(2) Date: Mar. 17, 2023

(87) PCT Pub. No.: WO2022/058376
PCT Pub. Date: Mar. 24, 2022

(65) Prior Publication Data
US 2023/0337188 A1 Oct. 19, 2023

(30) Foreign Application Priority Data

Sep. 18, 2020 (EP) .................................... 20197035

(51) Int. Cl.
*H04W 72/02* (2009.01)
*H04W 72/044* (2023.01)
*H04W 72/40* (2023.01)

(52) U.S. Cl.
CPC ......... *H04W 72/02* (2013.01); *H04W 72/044* (2013.01); *H04W 72/40* (2023.01)

(58) Field of Classification Search
CPC .... H04W 72/02; H04W 72/40; H04W 72/044
See application file for complete search history.

(56) References Cited

U.S. PATENT DOCUMENTS

2019/0394786 A1 12/2019 Parron et al.
2022/0039082 A1 2/2022 Belleschi et al.
(Continued)

OTHER PUBLICATIONS

Fraunhofer HHI et al: "Resource Allocation Enhancements for Mode 2" 3GPP Draft; RI-2005537, 3rd Generation Partnership Project (3GPP), Mobile Competence Centre ; 650, Route Des Lucioles ; F-06921 Sophia-Antipolis Cedex ; France ' vol. RAN WGI, No. e-Meeting; Aug. 17, 2020-Aug. 28, 2020 Aug. 7, 2020.
(Continued)

*Primary Examiner* — Won Tae C Kim

(57) ABSTRACT

A user device, UE, for a wireless communication system is described. The wireless communication system including a plurality of user devices, UEs. Responsive to a trigger for a transmission, the UE obtains a candidate resource set for the transmission by selecting resources for the transmission within a selection window following the trigger. The UE selects the resources by taking into consideration sensing results obtained by the UE during a sensing window preceding the trigger, and the sensing results indicate whether certain resources are available or unavailable for the transmission. The UE receives from one or more further UEs one or more reports or assistance information messages, AIMs, including resource allocation related assistance information, and considers a received report or AIM for selecting resources for the transmission when one or more predefined conditions are met.

37 Claims, 15 Drawing Sheets

(56) References Cited

U.S. PATENT DOCUMENTS

| | | | |
|---|---|---|---|
| 2023/0019726 A1* | 1/2023 | Kwon ................... | H04L 1/1822 |
| 2023/0171738 A1* | 6/2023 | Di Girolamo ........ | H04W 72/02 |
| | | | 370/329 |

OTHER PUBLICATIONS

Mediatek Inc. 3GPP Draft 3rd Generation Partnership Project (3GPP) Mobile Competence Centre, Aug. 8, 2020.
Fujitsu "Considerations on Inter-UE Coordination for Mode 2 Enhancements" 3GPP Draft, Aug. 7, 2020.
International Search Report and Written Opinion from PCT/EP2021/075373 mailed Mar. 24, 2022.

\* cited by examiner

100

102 core
network external networks backhaul 114

RAN₁

RAN₂

RANₙ

108₁ 108₂

UE₁

UE₂ gNBs core

116₂ gNB₂ 114₂

106₂

ANT gNBs gNB₁

116₁ 114₁

106₁

108₃

112₂ 112₁

110₁

IoT

UE₃

IoT gNBs core

116₄ gNB₄ 114₄

106₄

110₂ gNBs gNB₅ 114₅

116₅

106₅ gNBs gNB₃ 114₃

116₃

106₃

RANn

TX UE sensing window < RX UE sensing window, partial overlap between windows

TX UE sensing window < RX UE sensing window, total overlap of TX sensing window

TX UE sensing windows > RX UE sensing window, partial overlap between windows

TX UE sensing window > RX UE sensing window, total overlap of RX sensing window

TX UE selection window < RX UE selection window, partial overlap between windows TX UE selection window < RX UE selection window, total overlap of TX selection window TX UE selection windows > RX UE selection window, partial overlap between windows TX UE selection window > RX UE selection window, total overlap of RX selection window

TIMING ASPECTS FOR NR SL ASSISTANCE INFORMATION MESSAGES

CROSS-REFERENCE TO PRIOR APPLICATIONS

This application is the U.S. National Phase application under 35 U.S.C. § 371 of International Application No. PCT/EP2021/075373, filed on Sep. 15, 2021, which claims the benefit of EP Patent Application No. EP 20197035.7, filed on Sep. 18, 2020. These applications are hereby incorporated by reference herein.

The present invention relates to the field of wireless communication systems or networks, more specifically, to the field of device-to-device communications, like vehicle-to-everything, V2X, communications, within such a wireless communication system or network. Embodiments relate to the use of assistance information for deciding on resources to be used for a transmission by a user device, UE, like a UE operating in Mode 2 so as to autonomously carry out resource selection and allocation by sensing.

FIG. 1 is a schematic representation of an example of a terrestrial wireless network 100 including, as is shown in FIG. 1(a), the core network 102 and one or more radio access networks $RAN_1$, $RAN_2$, . . . $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station gNB, to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length. For example, in 5G a subframe has a duration of 1 ms, as in LTE. The subframe includes one or more slots, dependent on the subcarrier spacing. For example, at a subcarrier spacing of 15 kHz the subframe includes one slot, at a subcarrier spacing of 30 kHz the subframe includes two slots, at a subcarrier spacing of 60 kHz the subframe includes four slots, etc. Each slot may, in turn, include 12 or 14 OFDM symbols dependent on the cyclic prefix, CP, length.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including space borne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station, e.g., GSM, UMTS, LTE base stations, that may not support certain service, like NR V2X services.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2(a) is a schematic representation of an in-coverage scenario in which two UEs directly communicating with each other are both connected to a base station. The base station gNB has a coverage area that is schematically represented by the circle 150 which, basically, corresponds to the cell schematically represented in FIG. 1. The UEs directly communicating with each other include a first vehicle 152 and a second vehicle 154 both in the coverage area 150 of the base station gNB. Both vehicles 152, 154 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a Mode 1 configuration in NR V2X or as a Mode 3 configuration in LTE V2X.

FIG. 2(b) is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 156, 158 and 160 are shown directly communicating with each other over a sidelink, e.g., using the PC5 interface. The scheduling and/or interference management of the V2V traffic is based on algorithms implemented between the vehicles. This configuration is also referred to as a Mode 2 configuration in NR V2X or as a Mode 4 configuration in LTE V2X. As mentioned above, the scenario in FIG. 2(b) which is the out-of-coverage scenario does not necessarily mean that the respective Mode 2 UEs in NR or mode 4 UEs in LTE are outside of the coverage 150 of a base station, rather, it means that the respective Mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 150 shown in FIG. 2(a), in addition to the NR Mode 1 or LTE Mode 3 UEs 152, 154 also NR Mode 2 or LTE mode 4 UEs 156, 158, 160 are present. In addition, FIG. 2(b), schematically illustrates an out of coverage UE using a relay to communicate with the network. For example, the UE 160 may communicate over the sidelink with UE1 which, in turn, may be connected to the gNB via the Uu interface. Thus, UE1 may relay information between the gNB and the UE 160

Although FIG. 2(a) and FIG. 2(b) illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

It is noted that the information in the above section is only for enhancing the understanding of the background of the invention and, therefore, it may contain information that does not form prior art that is already known to a person of ordinary skill in the art.

Starting from the above, there may be a need for improvements or enhancements for user devices carrying out sensing for obtaining resources for a transmission.

Embodiments of the present invention are now described in further detail with reference to the accompanying drawings:

FIG. 1 is a schematic representation of an example of a terrestrial wireless network, wherein FIG. 1(*a*) illustrates a core network and one or more radio access networks, and FIG. 1(*b*) is a schematic representation of an example of a radio access network RAN;

FIG. 2 schematic represents in-coverage and out-of-coverage scenarios, wherein FIG. 2(*a*) is a schematic representation of an in-coverage scenario in which two UEs directly communicating with each other are both connected to a base station, and FIG. 2(*b*) is a schematic representation of an out-of-coverage scenario in which the UEs directly communicating with each other, FIG. 3 illustrates a sensing process be performed by a UE autonomously selecting resources for a transmission;

Embodiments of the present invention are now described in more detail with reference to the accompanying drawings, in which the same or similar elements have the same reference signs assigned.

As mentioned above, in a wireless communication system, like the one described above with reference to FIG. 1 and FIG. 2, a UE operating in Mode 2 is expected to carry out resource allocation autonomously. The UE does not receive any assistance from the radio access network, for example, from a base station or gNB in the form of dynamic or configured grants nor from any other source. Instead, the UE carries out sensing so as to determine available resources that may be used for a transmission. For example, the UE may autonomously select resources in accordance with the following steps:

the UE carries out sensing within a sensing window, for example by comparing a reference signal receive power, RSRP, measured in a resource within the sensing window to an RSRP threshold which may be derived on the basis of a priority of an intended transmission to be performed by the UE and a priority of a transmission indicated in a control message, like a SCI, on the measured resource, the UE excludes resources that are reserved by other UEs, and the UE performs a selection of final resources within a selection window.

Figure 3:
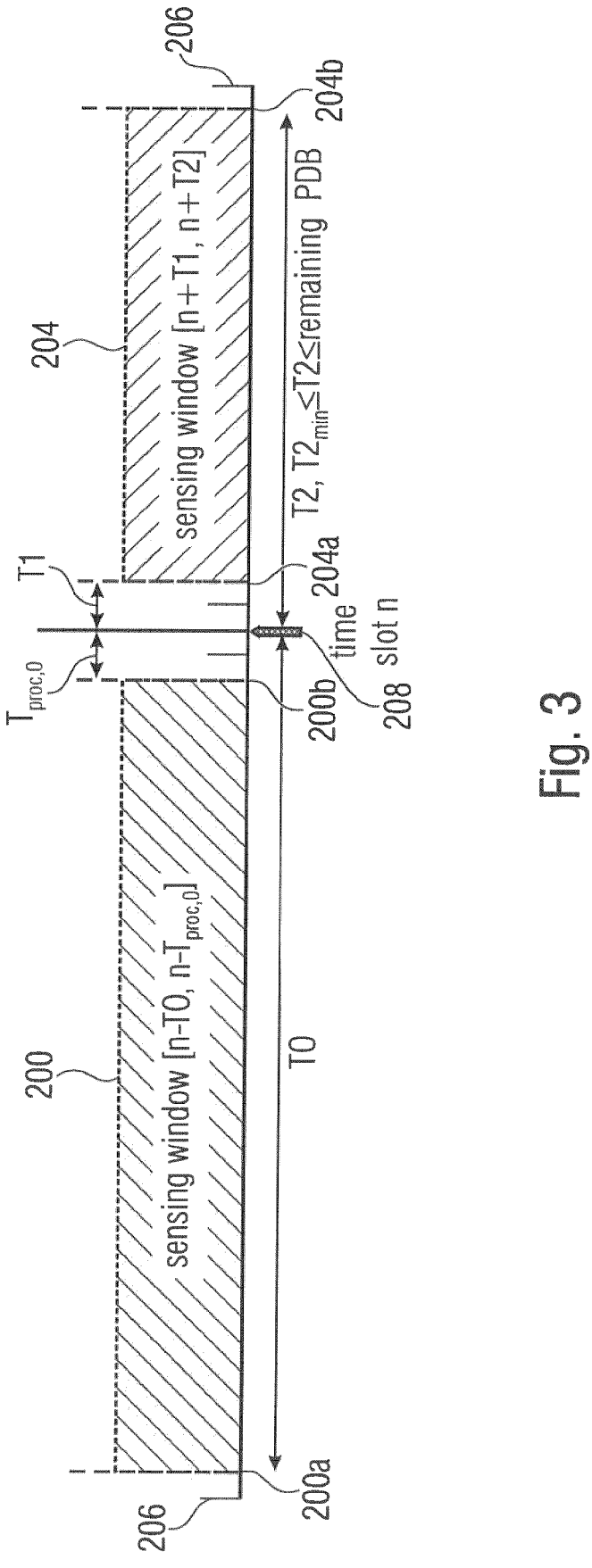

FIG. 3 illustrates the above-summarized sensing process that may be performed by a UE for autonomously selecting resources. FIG. 3 illustrates the above-mentioned sensing window 200 with its the start 200*a* and its end 200*b*, as well as the above-mentioned selection window 204 with its the start 204*a* and its end 204*b*. A plurality of time slots 206 are illustrated, and it may be seen that the sensing window 200 as well as the selection window 204 spans a certain number of time slots 206. FIG. 3 further illustrates at 208 the time slot n, which is the time slot at which a transmission to be performed by the UE is triggered. For example, the trigger may be that the UE determines that a buffer includes data or a data packet to be transmitted, so that responsive to this determination or trigger, at the time slot n, the UE selects resources to be used for the transmission of the data or packet in the transmit buffer. The selection is based on resource information obtained during the sensing window 200. In accordance with other examples, the transmission of data at time slot n may be triggered by the following events:

from a MAC layer perspective, when a protocol data unit, PDU, is generated by the MAC layer and is made available to the physical layer, from an application layer perspective, when an event, ranging from the availability of sensor information to be shared to an untoward incident, like an accident, generates data that needs to be transmitted.

Thus, the UE, responsive to the trigger for the transmission, obtains a candidate resource set for the transmission by selecting resources for the transmission within the selection window 204 that follows the time slot n or the trigger. The UE selects the resources by taking into consideration the sensing results obtained by the UE during the sensing window 200 preceding time slot n or the trigger. The sensing results indicate whether certain resources are available or unavailable for the transmission.

The process of sensing is where a Mode 2 UE takes into account, for example, first stage SCIs received from other UEs so as to identify resources that have been reserved by these other UEs in the recent past. The UE also measures the sidelink, SL, RSRP in the time slots defining the sensing window 200 so as to determine interference levels if the UE were to transmit using these resources. This enables the UE to identify resources which are available for the transmission as well as resources that are not available for the transmission. When the UE intends to carry out the transmission, for example responsive to the trigger event at time slot n, the process of resource selection is triggered where the UE considers the sensing results over a time period in the past, prior to the triggering of the transmission or the resource selection. The just-mentioned time period in the past is the sensing window 200 which is the time period within which the UE considers the sensing results in order to determine possible resources for the transmission. As is illustrated in FIG. 3, the sensing window 200 commences a certain time 200*a* in the past with reference to the time slot n at which the transmission is triggered. The time period from the time slot n at which the sensing window 200 commences is the time $T_0$ that has a certain configured or preconfigured length of, for example, 1100 ms or only 100 ms. The sensing window 200, in the example of FIG. 3, concludes 200*b* shortly before the selection process or transmission is triggered at time slot n. The time period between the end of the sensing window 200 and the time slot n is indicated in FIG. 3 as $T_{proc,0}$. In accordance with other examples, the sensing window may conclude immediately at the time slot n so that $T_{proc,0}=0$. Thus, the duration of the sensing window may be defined by $[n-T0, n-T_{proc,0}]$.

$T_0$ may be defined by higher layers, for example by a resource pool, RP, configuration using the parameter sL-SensingWindow-r16. TO may be between 100 ms and 1100 ms. $T_{proc,0}$ may be defined as indicated in the following table, dependent on the subcarrier spacing used in the resource pool.

| $\mu_{SL}$ | $T_{proc, 0}$ [slots] |
|---|---|
| 0 | 1 |
| 1 | 1 |
| 2 | 2 |
| 3 | 4 |

The results generated by the sensing process are called sensing results. The sensing results indicate for a set of time and frequency resources whether certain resources are available and/or unavailable for a transmission. The indicated resources may be within a specific resource pool, like a sidelink resource pool of the wireless communication system, and are spread over a specific duration of time in the past, namely the sensing window 200.

On the basis of the information obtained by the sensing process, the UE, for the transmission triggered at time slot n, selects resources within the selection window 204. As it is depicted in FIG. 3, the selection window begins 204a shortly after the transmission or resource selection trigger, for example at a time period T1 following time slot n. In other examples, the selection window 204 may start immediately at time slot n so that T1=0. The end 204b of the selection window is the time T2 that is determined, for example by the packet delay budget, PDB, associated with the data or packet that is to be transmitted by the UE. The selection window 204 is the time period within which the UE selects resources by taking into account the sensing information, extrapolating the available resources based on the sensing information and selecting resources for the transmission triggered.

The duration of the selection window 204 may be defined by [n+T1, n+T2], where T1 and T2 may be defined in accordance with the UE implementation. $T_1$ may as follows: $0<T1<T_{proc,1}$, where $T_{proc,1}$ may be defined as shown in the following table with reference to the subcarrier spacing used for the resource pool from the which the resources for the transmission are selected.

| $\mu_{SL}$ | $T_{proc, 1}$ [slots] |
|---|---|
| 0 | 3 |
| 1 | 5 |
| 2 | 9 |
| 3 | 17 |

$T_2$ may be defined based on the packet delay budget, PDB, and T2 min, which may be defined by higher layers, for example, using a resource pool, RP, configuration, by the parameter SL-SelectionWindow-r16, may take a value between 1, 5, 10 and 20 milliseconds, dependent on a priority of the data or packet to be transmitted by the UE. For example, in case $T_2$<remaining PDB, the following holds:

if T2<remaining PDB, $T2_{min} \leq T2 \leq$remaining PDB
 else, T2=remaining PDB If a resource within the selection window 204 is deemed to be below an SL RSRP threshold, which may be determined by a priority of the data or packet to be transmitted and the SCI associated with a transmission to be performed by another UE on the given resource, the resource may be included into the so-called candidate resource set. The candidate resource set includes a set of time and frequency resources and indicates whether certain resources are available or unavailable for the transmission. The indicated resources may be within a specific resource pool, like the sidelink resource pool, and may spread over a certain duration of time in the future, namely the selection window 204.

In case the number of resources in the candidate resource set is below a certain percentage with respect to the overall number of resources in the selection window 204, this means that the number of resources may not be sufficient for transmitting the data or packet. In such a case, the UE may relax the SL RSRP threshold previously used, for example in steps of 3 dB. The percentage of available resources may be associated with a priority of the intended transmission, and once the required size of the candidate resource set is achieved, the UE randomly selects resources from the populated candidate resource set for the transmission of the data or packet.

The conventional approach of carrying out sensing to identify the candidate resource set requires a substantial amount of operations to be carried out by the UE, which, for example, in case of power sensitive and/or bandwidth restricted UEs, like battery driven devices, may be disadvantageous in terms of power saving and required complexity. Moreover, since the sensing operations needs to be carried for a substantial period of time, namely during the sensing window 200, so as to obtain adequate resources for the transmission triggered at time slot n, the sensing leads to an increase in the latency for the transmission of data packets. While the increased latency issue may be addressed by decreasing the time period for performing the sensing operations, i.e., reducing the duration of the sensing window 200, this, in turn, leads to a situation that, due to the shortened sensing window 200, non-optimal or inadequate resources may be determined by the UE leading, in turn, to a transmission with a reduced reliability. This problem regarding the increase in latency/reduced reliability may be further aggravated in situations in which the UE operates in a discontinuous reception, DRX, mode.

To address the above-summarized drawbacks, the UE may receive one or more reports, also referred to in the following as one or more assistance information messages, AIMs, which include resource allocation related assistance information. By employing such inter-UE coordination, the above drawbacks are addressed and the UE, at the time of triggering a transmission, like at the time slot n, may also rely on the additional information provided to the UE via the assistance information messages including further resource allocation related assistance information. Further details regarding the provision of assistance information may be found in European patent application EP 20 164 706.2 with the title "NR Sidelink Assistance Information Messages" filed with the European Patent Office on Mar. 20, 2020, the content of which is incorporated herewith by reference.

The one or more AIMs, which the UE may receive from one or more other UEs in the network, support the UE's sensing process for obtaining resources for the transmission triggered at time slot n, as long as the information in the AIM is useful for supporting the UE's sensing process. For example when indicating resources in the sensing window or in the selection window, the received AIMs are advantageous as they address the above-mentioned drawbacks in a sensing process not making use of the additional assistance information. However, in case the AIM includes resources or is associated with sensing results for resources that are outdated, for example which were obtained during a time period far in the past, there is the potential danger that other UEs, in the meantime, reserved these UEs for their transmissions. In such cases, the UE, after having processed the AIM, may select resources for its transmission based on outdated information so that the transmission reliability may suffer, e.g., due to an increased level of interference on the resources and the like. The issue of an invalid or outdated AIM is exponentially increased when the UE may not carry out sensing on its own, and relies entirely on the AIM to provide the UE with resources for upcoming transmissions. This may result in resource collisions only because of using an outdated AIM.

Figures 1A, 1B:
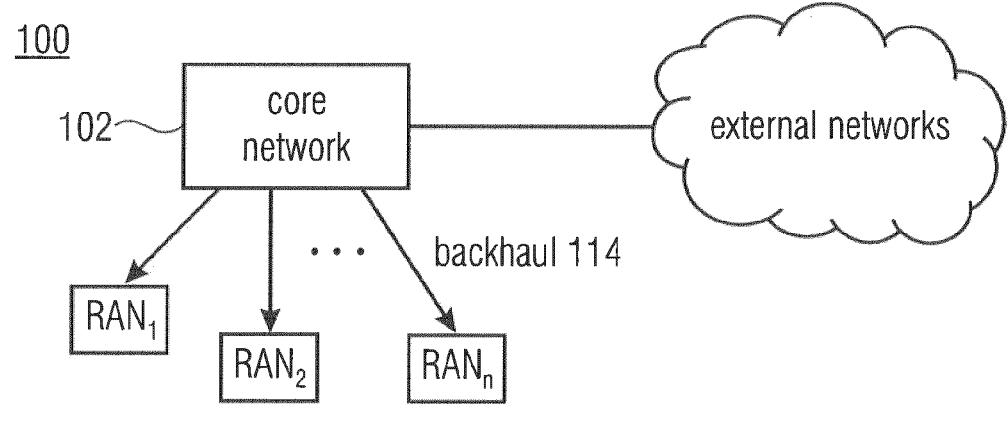
Figure 2A:
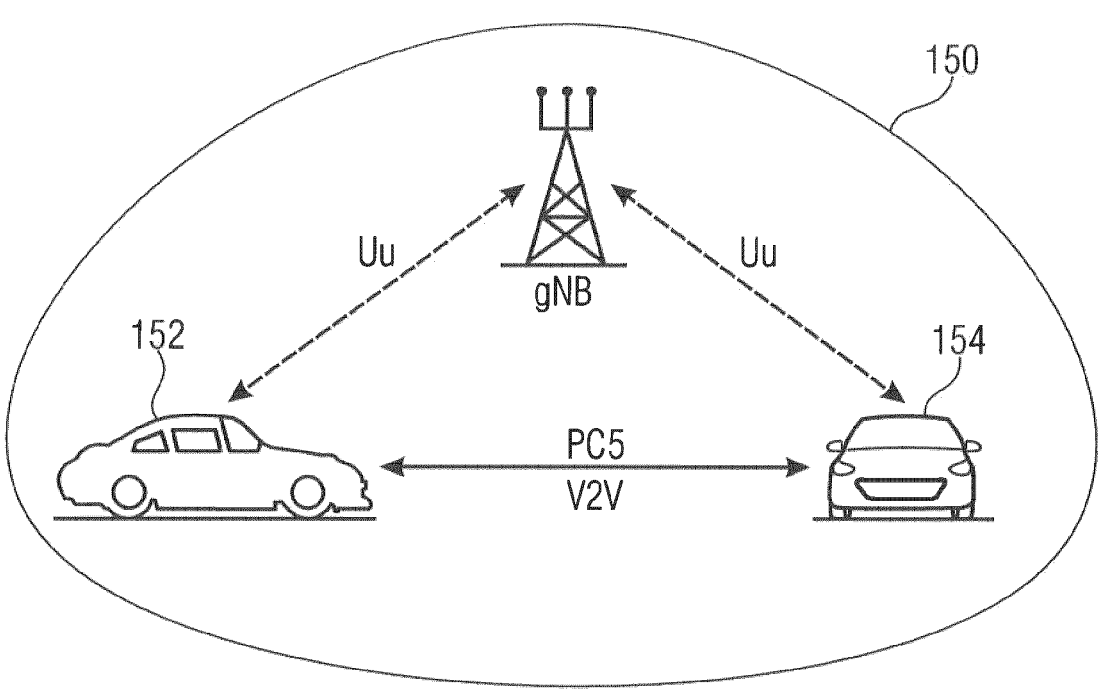
Figure 2B:
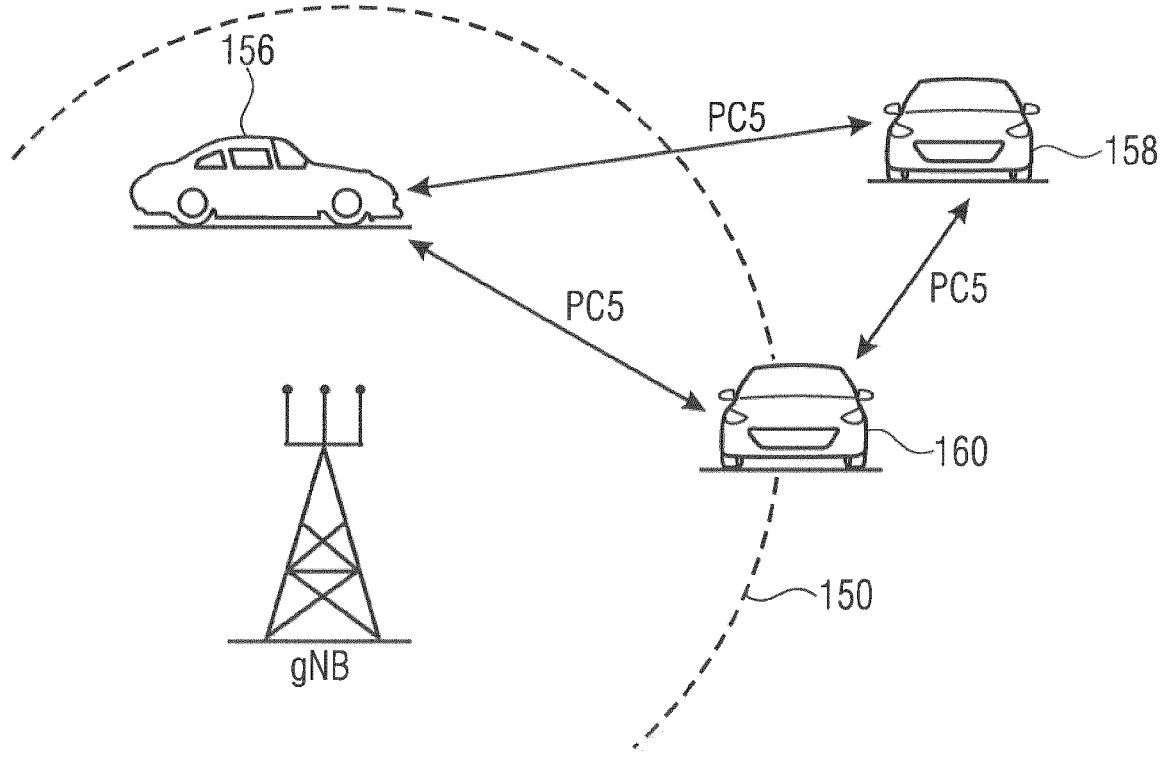
Figure 4:
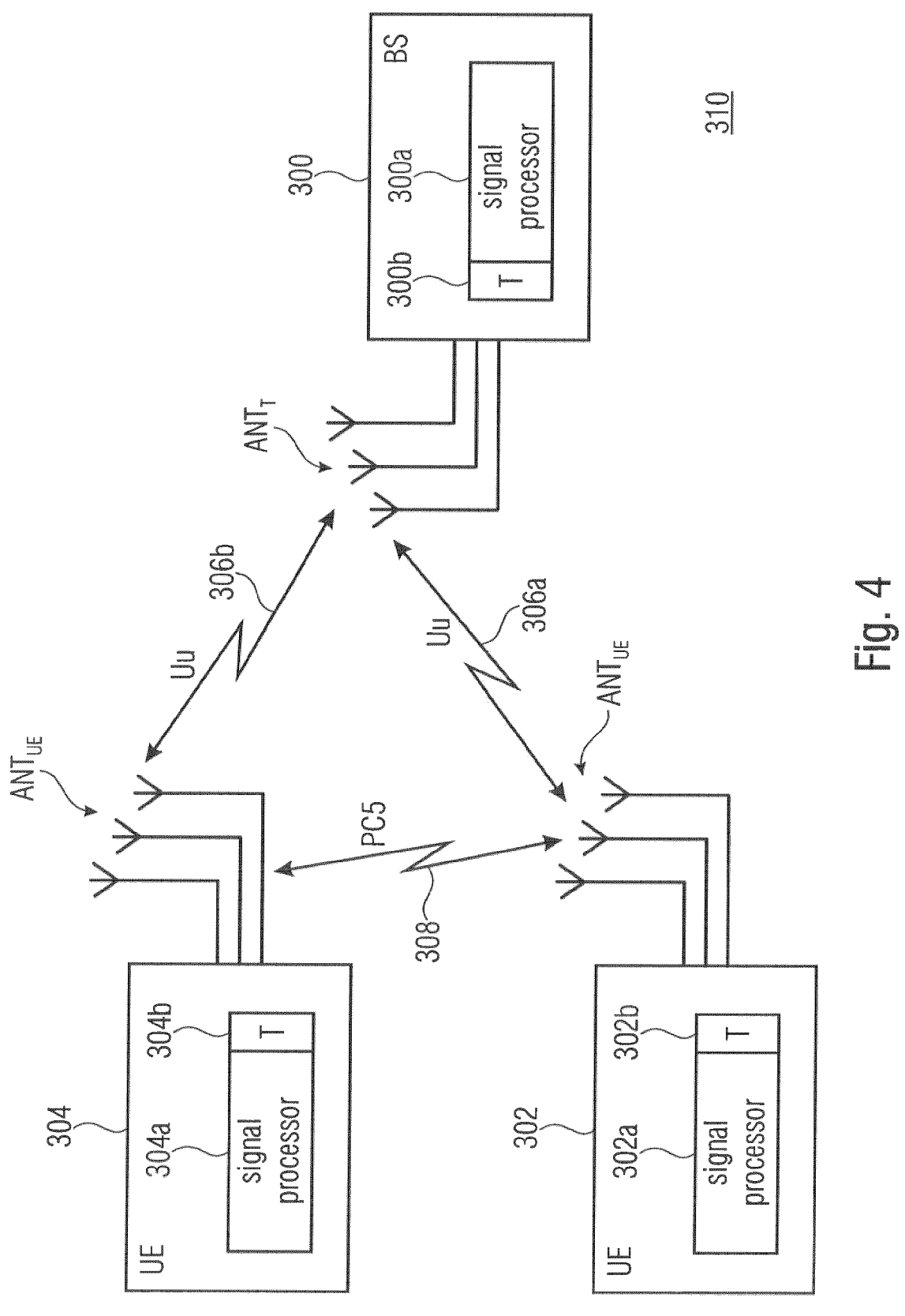
FIG. 4 is a schematic representation of a wireless communication system including a transmitter, like a base station, one or more receivers, like user devices, UEs, for implementing embodiments of the present invention.

Embodiments of the present invention address this issue and provide for an improved sensing process of the UE by exploring the timing aspects of the one or more AIMs, for example the timing conditions within which the UE may validate, consider and use the information about the resources indicated in the one more AIMs. In other words, the inventive approach teaches that the UE is to consider a received AIM for selecting resources for transmission triggered at a certain time, like time slot n, only when one or more predefined conditions are met on the basis of which the UE may judge that the information included in the one or more AIMs is useful for the current sensing process. Otherwise, the AIMs are discarded by the UE for at least the current transmission triggered at the certain time, i.e., the resource information is not taken into consideration for the resource selection process or the sensing process for obtaining a candidate resource set for performing the transmission triggered. Embodiments of the present invention may be implemented in a wireless communication system as depicted in FIG. 1 including base stations and users, like mobile terminals or IoT devices. FIG. 4 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 4, the one or more UEs 302, 304 of FIG. 4, and the base station 300 of FIG. 4 may operate in accordance with the inventive teachings described herein.

User Device

The present invention provides a user device, UE, for a wireless communication system, the wireless communication system including a plurality of user devices, UEs, wherein, responsive to a trigger for a transmission, the UE is to obtain a candidate resource set for the transmission by selecting resources for the transmission within a selection window following the trigger, wherein the UE is to select the resources by taking into consideration sensing results obtained by the UE during a sensing window preceding the trigger, the sensing results indicating whether certain resources are available or unavailable for the transmission, wherein the UE is to receive from one or more further UEs one or more reports or assistance information messages, AIMs, including resource allocation related assistance information, and wherein the UE is to consider a received report or AIM for selecting resources for the transmission when one or more predefined conditions are met.

In accordance with embodiments, the UE is to communicate with one or more further UEs using a sidelink, SL, interface, like a PC5 interface, and/or one or more radio access network, RAN, entities of the wireless communication system, like one or more base stations, using a radio interface, like a Uu interface, or using a shared access band, like an unlicensed band.

In accordance with embodiments, the predefined conditions comprise one or more of the following:

a time at which the report or AIM is received at the UE, a time window within which resources indicated in the report or AIM are valid, an expiry timer, a priority value associated with the AIM is less than or equal to a priority value which is configured or preconfigured and/or associated with the triggered transmission, a QoS level associated with the AIM is higher than or equal to a QoS level which is configured or preconfigured and/or associated with the triggered transmission, a distance of the further UE providing the AIM to the UE is inside a range which is configured or preconfigured and/or associated with the triggered transmission, an identification, like a source ID or a group ID, associated with the AIM indicates a further UE or a group of further UEs to which the triggered transmission is to be directed.

In accordance with embodiments, the resource allocation related assistance information indicates sensing results obtained by the further UE, and the UE is to consider the AIM when the AIM is received prior to the trigger for the transmission within the sensing window and/or between an end of the sensing window and the trigger for the transmission.

In accordance with embodiments, the UE is to consider the AIM when the AIM is received at least a minimum time after the start of the sensing window.

In accordance with embodiments, the UE is to consider the AIM when the AIM is received at least a minimum time before the trigger for the transmission or before the end of the sensing window.

In accordance with embodiments, the minimum time takes into account the time taken by the further UE to generate and send the AIM to the UE, and/or at least a partial overlap between the sensing window used by the further UE for generating the sensing results and the sensing window of the UE.

In accordance with embodiments, the minimum time is configured or pre-configured at:

a system level, e.g., by the network, a gNB, a SIM-card, or is hard-coded in the UE, and/or a resource pool level, e.g. in the resource pool configuration, and/or a transmission level, e.g. in a DCI or SCI for the transmission of a given transport block, TB.

In accordance with embodiments, the resource allocation related assistance information indicates a candidate resource set or a set of specific resources, meant to be used by the UE for its transmission, determined by the further UE and includes at least one resource within the selection window of the UE, and the UE is to consider the AIM when the AIM is received at any time prior to the trigger.

In accordance with embodiments, the resource allocation related assistance information indicates periodic resources determined by the further UE of which at least n resources, with n being an integer 1 pertain to resources within the selection window, and the UE is to consider the resource allocation related assistance information for the at least one resource when the AIM is received at any time prior to the trigger.

In accordance with embodiments, the resource allocation related assistance information indicates sensing results obtained by the further UE during a further sensing window, and the UE is to consider the AIM when the sensing window and the further sensing window partially or fully overlap.

In accordance with embodiments, in case there is a partial overlap of the sensing window and the further sensing window, the UE is to consider only information pertaining to resources within the partial overlap, and is to discard information pertaining to resources outside the partial overlap.

In accordance with embodiments, the resource allocation related assistance information indicates a candidate resource set or a set of specific resources meant to be used by the UE for its transmission, determined by the further UE during a further selection window used by the further UE, and the UE is to consider the AIM when the selection window and the further selection window partially or fully overlap.

In accordance with embodiments, in case there is a partial overlap of the selection window and the further selection window, the UE is to consider only information pertaining to resources within the partial overlap, and is to discard information pertaining to resources outside the partial overlap.

In accordance with embodiments, an expiry timer is associated with the report or the AIM, and the UE is to consider the AIM as long as a timer value of the expiry time has not expired.

In accordance with embodiments, the timer value of the expiry timer counts down a validity of the AIM, wherein the timer value may be in units of OFDM symbols, time slots, subframes, frames, seconds, or milliseconds.

In accordance with embodiments, the expiry timer is paused if the UE is in DRX-mode and not receiving.

In accordance with embodiments, the expiry timer is set by the further UE from which the AIM is received, and the UE is to obtain the timer value from a control message, like a PC5 RRC message, a SCI, a SLIB, associated with the AIM.

In accordance with embodiments, on receiving the AIM and the associated timer value, the UE is to start a timer countdown, or modify the timer value responsive to one or more conditions and start a modified timer countdown.

In accordance with embodiments, no expiry timer is set by the further UE from which the AIM is received, and on receiving the AIM, the UE is to start a timer countdown of the expiry timer.

In accordance with embodiments, the timer value of the expiry timer depends or is modified dependent on one or more of the following criteria:

a content of the AIM, a channel condition between the UE and the further UE providing the AIM, a priority or a Quality of Service, QoS, level of the AIM transmission, a resource pool occupation, a resource pool configuration parameter, a distance between the UE and the further UE providing the AIM.

In accordance with embodiments, in case the timer value of the expiry timer depends or is modified dependent on the content of the AIM if the AIM contains sensing results, the UE is to set the expiry timer to a time period of the sensing window between a start of the sensing window and the time the UE received the AIM, or if the AIM contains a candidate resource set, the UE is to set the expiry timer to the remainder of the selection window, starting from the time the UE received the AIM, or in case the timer value of the expiry timer depends or is modified dependent on the channel condition between the UE and the further UE providing the AIM, the timer value is set to a first value when changes of a channel condition between the UE and the further UE during a certain time period are outside predefined boundaries, and wherein the timer value is set to a second value longer than the first value when changes of the channel condition between the UE and the further UE during the certain time period are within the predefined boundaries, or the UE is to estimate a pathloss or a received power of an AIM transmission or averaged over a time window, wherein the UE is to set the timer value to a first value when the pathloss is below a first threshold and/or the received power is above a second threshold, and wherein the UE is to set the timer value to a second value shorter than the first value when the pathloss is above the first threshold and/or the received power is below the second threshold, or the UE is to determine an aging of a channel between the UE and the AIM source, wherein the UE is to reduce the timer value or to increase an increment of the set expiry timer when the age of the channel is at or above a predefined threshold.

in case the timer value of the expiry timer depends or is modified dependent on the priority or the QoS level of the AIM transmission, the UE is to set the timer value to a first value when the priority or QoS level is below a threshold, and wherein the UE is to set the timer value to a second value shorter than the first value when the priority or QoS level is above the threshold, and/or in case the timer value of the expiry timer depends or is modified dependent on the resource pool occupation, the UE is to set the timer value to a first value when a resource pool occupation is above a threshold, and wherein the UE is to set the timer value to a second value longer than the first value when the resource pool occupation is below the threshold, and/or in case the timer value of the expiry timer depends or is modified dependent on the resource pool configuration parameter, the UE is configured with the timer value of using a resource pool configuration, and/or in case the timer value of the expiry timer depends or is modified dependent on the distance between the UE and the further UE providing the AIM, the UE is to set the timer value to a first value when a distance between the UE and the further UE is above a threshold, and wherein the UE is to set the timer value to a second value shorter than the first value when the distance between the UE and the further UE is below the threshold.

In accordance with embodiments, the UE is to terminate the expiry timer for a first AIM when receiving a second AIM pertaining to some of all of the resources indicated in the first AIM.

In accordance with embodiments, the UE is to terminate the expiry timer for the first AIM when the further UE providing the second AIM has a hierarchy higher than a hierarchy of the further UE providing the first AIM.

In accordance with embodiments, the UE is to not longer consider a first AIM when receiving a second AIM pertaining to some of all of the resources indicated in the first AIM.

In accordance with embodiments, the UE is to not longer consider the first AIM when the further UE providing the second AIM has a hierarchy higher than a hierarchy of the further UE providing the first AIM.

In accordance with embodiments, the first and second AIMs are provided by the same UE, or wherein the first and second AIMs are provided by different UEs.

In accordance with embodiments, the AIM includes resources to be used by the UE for a transmission to one or more of the further UEs, the one or more further UEs being different or the same from the further UE providing the AIM.

In accordance with embodiments, the UE is to receive the one or more AIMs at periodic intervals, and/or responsive to a request by the UE, and/or responsive to one or more implicit events.

In accordance with embodiments, responsive to receiving the one or more AIMs containing resource allocation related assistance information indicating sensing results obtained by the one or more further UEs, the UE is not to consider the sensing results obtained by the UE during the sensing window, but is to select the resources during the selection window by taking into consideration only the resource allocation related assistance information included in the one or more AIMs.

In accordance with embodiments, responsive to receiving the one or more AIMs containing resource allocation related assistance information indicating a candidate resource set or a set of specific resources, meant to be used by the UE for its transmission, obtained by the one or more further UEs, the UE is not to not carry out the sensing procedure during the sensing window, but is to provide to the higher layers the candidate resource set from the one or more AIMs for a random resource selection, or select the set of specific resources from the one or more AIMs.

In accordance with embodiments, receiving the one or more AIMs, the UE is to select the resources during the selection window by taking into consideration the sensing results obtained by the UE during the sensing window and the resource allocation related assistance information included in the one or more AIMs.

In accordance with embodiments, the resource allocation related assistance information indicates resources available, wherein the indicated resources are in the form of, e.g., one or more of the following:

one or more resources within a resource pool to be used for transmission by the UE to the one or more further UEs, for periodic transmissions, e.g., semi-persistent transmissions, or for aperiodic transmissions, e.g., one-shot transmissions, interference information, e.g., RSRQ or SINR reports, a sensing report, e.g., a zonal area resource usage map, ZARUM.

In accordance with embodiments, AIM indicates the resources in any one of the following manners:

by a list of all resource blocks, RBs, that are available in one or more time slots, by a list of all resource blocks, RBs, that are unavailable in one or more time slots, by a list of resource blocks, RBs, for which collisions are expected, e.g., a list of reserved resources where the further UE is expected to transmit as well.

In accordance with embodiments, the AIM indicates the resources across time in any one of the following manners:

by a bitmap across time, the bitmap indicating resources, like OFDM symbols or time slots or subframes or frames, where the resource set is defined, spanning either a portion or the entire length of the one BWP, by a starting resource, like a time slot or a subframe, and a duration of the resource set, by explicit resources numbers, like time slot or subframe numbers, by puncturing out resources mentioned explicitly or that are part of another set of resources or RP, by a starting resource, and periodic offsets for subsequent occurrences, by a pattern of symbols, time slots or subframes or frames, by a formula used to define the time resource indicator value, TRIV.

and/or the AIM indicates the resources across frequency in any one of the following manners:

by a bitmap, the bitmap the bitmap indicating resources, like resource blocks, across the one BWP, by a starting resource, like a resource block, and a number of resources for a resource set, by multiple starting resources, like resource blocks, and ending resources, if the resource set is non-contiguous over frequency, by explicit resource indices, like resource block indices, by puncturing out resources mentioned explicitly or that are part of another set of resources or RP, by a starting resource, and periodic offsets for subsequent occurrences, by a pattern of resource blocks or subchannels,

by a formula used to define the frequency resource indicator value, FRIV.

and/or the AIM indicates the resources across time and frequency in any one of the following manners:

by a matrix, the matrix indicating the resources across time, like symbols, time slots or subframes or frames, and across frequency, like resource blocks or subchannels, by a pattern, the pattern indicating the resources across time, like symbols, time slots or subframes or frames, and across frequency, like resource blocks or subchannels.

In accordance with embodiments, the UE is to receive the one or more AIMs in one or more of the following methods:

using a configuration message, like a PC5 RRC configuration or MAC CE message, in a unicast, multicast, groupcast or broadcast manner, or as a part of a control message, like a SCI, e.g., contained within a 2nd-stage SCI, the SCI including fields informing the further UE (UE-B) about the content of the AIM, or as a part of a data transmission, which is indicated by parameters in the accompanying control message, like a SCI, or as an information block, e.g., in the PSSCH as a sidelink information block, SLIB.

Network/System

The present invention provides a wireless communication system, comprising:

a plurality of user devices, UEs, configured for a sidelink communication using, for example resources from a set of sidelink resources of the wireless communication system, wherein the plurality of UEs comprises one or more of the inventive UEs, and wherein the plurality of UEs comprises one or more of the further UEs.

In accordance with embodiments, e.g., in case the further UE is out-of-coverage or is operating in Mode 2, the further UE is to obtain a candidate resource set for a transmission by selecting resources for the transmission within a selection window of the further UE, wherein the further UE is to select the resources by taking into consideration sensing results obtained by the further UE during a sensing window of the further UE, the sensing results indicating whether certain resources are available or unavailable for the transmission, and send one or more AIMs including the sensing results and/or the candidate resource set.

In accordance with embodiments, the further UE is to obtain resources for the AIM from resources provided to the further UE by a base station of the wireless communication system directly, e.g., in case the UE is in Mode 1 or in-coverage, or indirectly via a relay, e.g., in case the UE is in Mode 2 or in- or out-of-coverage.

Method

The present invention provides a method of operating a user device, UE, for a wireless communication system, the wireless communication system including a plurality of user devices, UEs, the method comprising:

responsive to a trigger for a transmission, obtaining a candidate resource set for the transmission by selecting resources for the transmission within a selection window following the trigger, wherein the resources are selected by taking into consideration sensing results obtained during a sensing window preceding the trigger, the sensing results indicating whether certain resources are available or unavailable for the transmission, receiving from one or more further UEs one or more reports or assistance information messages, AIMs, including resource allocation related assistance information, and considering a received report or AIM for selecting resources for the transmission when one or more predefined conditions are met.

Computer Program Product

Embodiments of the present invention provide a computer program product comprising instructions which, when the program is executed by a computer, cause the computer to carry out one or more methods in accordance with the present invention.

Figure 5:
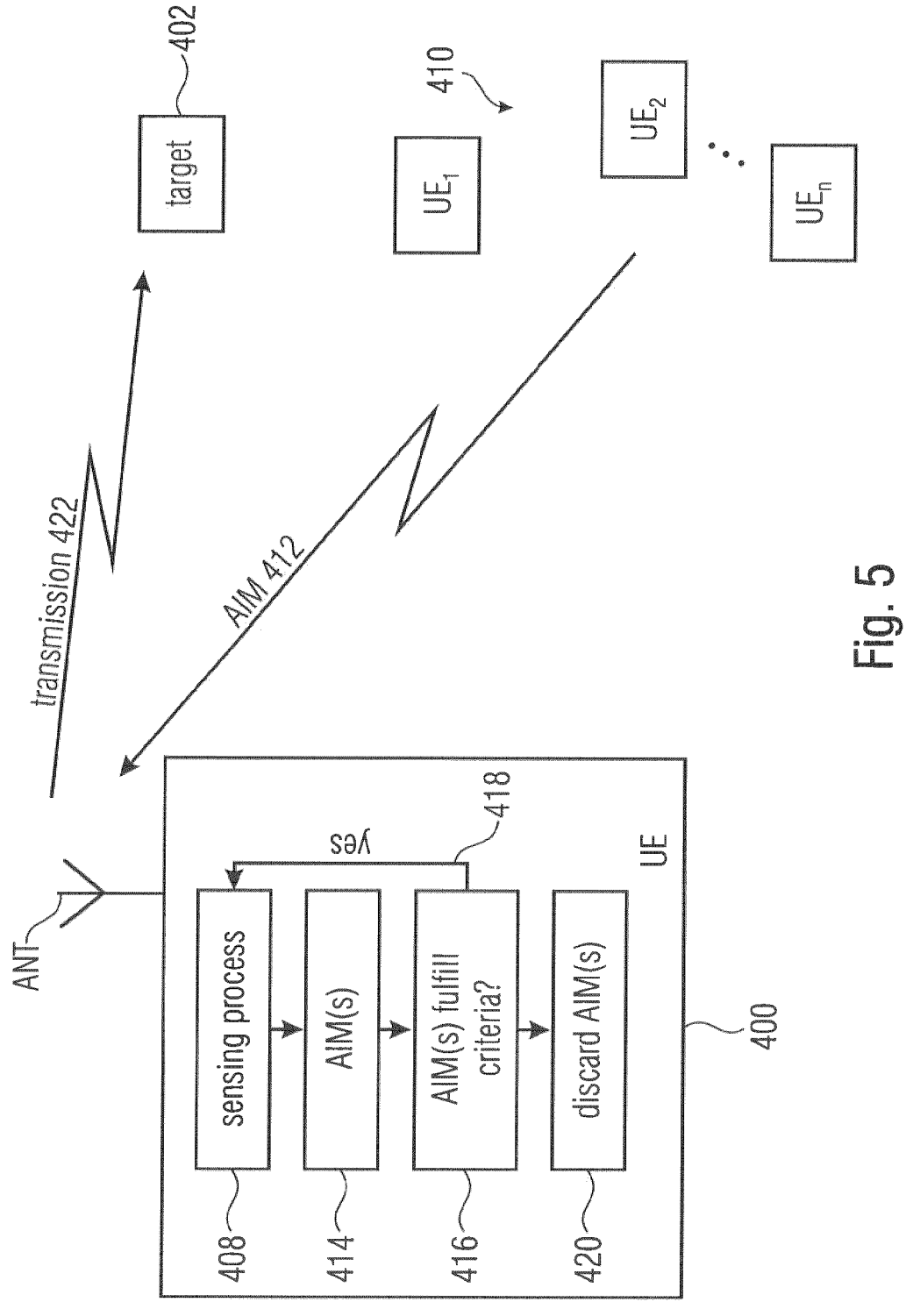
FIG. 5 illustrates a user device, UE, in accordance with embodiments of the present invention.

FIG. 5 illustrates a user device, UE, in accordance with embodiments of the present invention. FIG. 5 schematically illustrates a part of a wireless communication system or network, like the one described above with reference to FIG. 1 and FIG. 2. The UE 400 may be a Mode 2 UE operating in a way as described above. The UE 400 is to communicate with one or more targets 402, for example for transmitting a data packet from the UE 400 to the target 402. Such a transmission is also referred to as the triggered transmission which is transmission triggered by the UE 400 at a certain time slot n, as explained above with reference to FIG. 3. In this situation, the UE 400, which has to sense resources for the transmission autonomously, starts the above-described sensing process, as is indicated at 408 for obtaining the candidate resource set for the transmission. The UE selects resources for the transmission within the selection window 204 (see FIG. 3) following the trigger of the transmission at time slot n. The UE 400 selects the resources by taking into consideration the sensing results obtained during the sensing window 200 (see FIG. 3) preceding the trigger of the transmission. The sensing results indicates certain resources available or unavailable for the transmission. The wireless communication network includes a plurality of UEs including UE 400 and the further UEs 410, like UE1, UE2, . . . UEn. The UE 400 receives from one or more of UEs 410 or from even UE 402 one or more reports or assistance information messages, AIMs, 412 which include resource allocation related assistance information, for example information about resources being available or unavailable for a transmission that the further UEs 410 or UE 402 found by a sensing processes performed by these UEs. As is schematically indicated at 414, UE 400 receives the AIM and, at 416, determines whether one or more predefined conditions are fulfilled. In case the conditions are fulfilled, the AIM received is used for the sensing or selection process 408, as is indicated at 418. If the AIM contains an exact resource or a set of resources for UE 400 to use, the resources indicated in the AIM is used directly by UE 400 for its own transmission 422. Otherwise, as is indicated at 420, the AIM is not considered by the UE, at least not for the current transmission. The UE 400 then performs the sensing or selection process 408 and takes into consideration the additional information from the received AIM, in case the predefined conditions are met, thereby determining the resources to be used for the transmission 422 to the target 402.

In accordance with embodiments, the target 402 may be another UE in the wireless communication network, also a UE 410 that provided an AIM, so that the communication over which the transmission 422 is transmitted, may use a sidelink, SL, interface, like the PC5 interface. In accordance with other embodiments, the target 402 may be a radio access, RAN, entity, like one or more base stations, and the communication of the transmission 422 may be via a radio interface, like the Uu interface, or it may use a shared access band, like an unlicensed band in case of NR-U.

In accordance with embodiments of the present invention, UE 400 of FIG. 5 may decide to consider one or more AIMs received from one or more of UEs 410 or UE 402 dependent on one or more of the following criteria:

a time at which the report or AIM is received at the UE 400, a time window within which resources indicated in the report or AIM are valid, an expiry timer, a quality of service, QoS, level or priority value associated with AIM, a distance of the further UE 410 providing the AIM to the UE 400, an indication, like a source ID or a group ID, associated with the AIM.

On the basis of the above-referenced one or more criteria, UE 400 validates the one or more AIMs it receives so as to determine when to consider resource information of received AIM for the resource selection to be performed during the sensing operation 408.

Time at which the AIM is Received

To use the information contained within an AIM for the resource selection procedure, UE 400 is to receive the AIM at a certain time so that the resources indicated in the AIM are within a time window, like the sensing window or the selection window used by the UE 400 for the sensing process 408. In other words, by making sure that the AIM is received within a certain time window, a reliable resource selection may be achieved because outdated information about the resources' availability/unavailability are not taken into consideration by UE 400.

Figures 6, 7A:
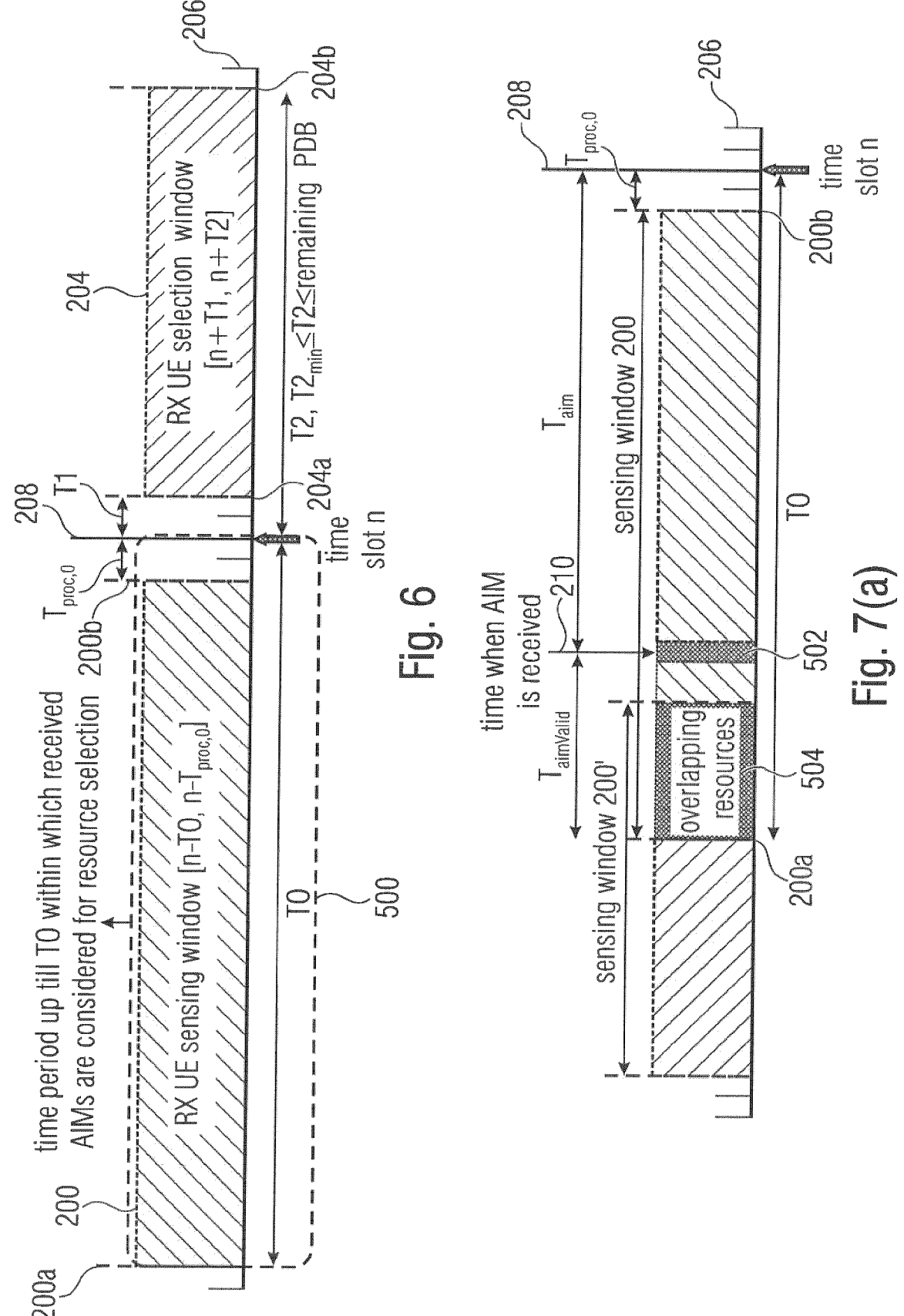
FIG. 6 illustrates a time period within which an AIM is to be received at a UE for consideration when the AIM includes sensing results.

In accordance with embodiments, in case the AIM indicates sensing results obtained by a further UE 410 or UE 402, the UE 400 considers the AIM in case it is received prior to the trigger for the transmission within the sensing window and/or between an end of the sensing window and the trigger for the transmission. In other words, UE 400 considers the information provided in an AIM only if received by the UE any time before the time slot n at which the UE triggered the transmission for which it carries out the sensing process until the start of the sensing window in the past. This condition is true for an AIM containing sensing results because any AIM relating to resource information obtained earlier than the start of the UE's current sensing window (the sensing window for the current transmission) points to a sensing report even further prior to the sensing window of the UE 400 rendering the AIM or report outdated or useless for the UE's selection process 408. FIG. 6 illustrates the time period within which an AIM is to be received at the UE 400 when the AIM includes sensing results. FIG. 6 illustrates, like FIG. 3, at 208, the time slot n at which the transmission is triggered responsive to which UE 400 carries out the sensing process within the sensing window 200 that reaches for the time period TO into the past. FIG. 6 further indicates, at 500, the time period within which a received AIM is considered by the UE for the resource selection process. As mentioned above, the time period may be the entire period from the start 200*a* of the sensing window 200 to the time slot n, or only the time period of the sensing window, i.e., between the start 200*a* and the end 200*b* of the sensing window 200, or received in the time period between the end 200*b* of the sensing window 200 and time slot n.

Figures 7B, 7C:
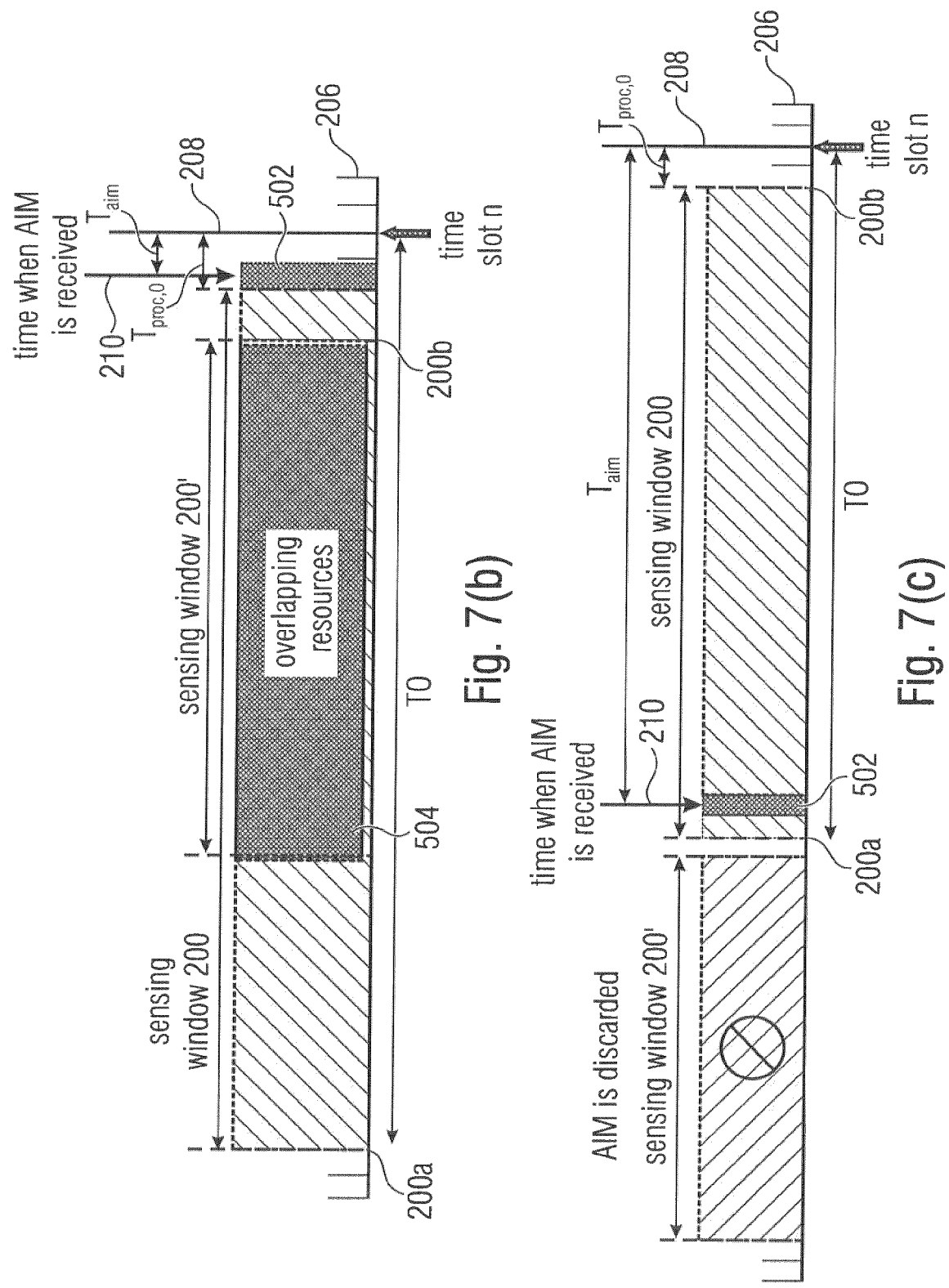
FIG. 7 illustrates examples for receiving an AIM including sensing results.

FIG. 7 illustrates examples for receiving an AIM including sensing results. FIG. 7 is similar to FIG. 6, however, only the left part of FIG. 6 is indicated, i.e., the time slot n and the preceding time period. In FIG. 7, the sensing window 200 of UE 400 is indicated, and also a sensing window 200' of a further UE 410 or UE 402 that provided an AIM 502 at a certain time 210. FIG. 7(*a*) indicates an example in which the AIM 502 was received 210 at the UE 400 between the start 200*a* and the end 200*b* of the sensing window 200, i.e., at a time $T_{AIM}$ ahead of the time slot n. Thus, the condition $$|n-T_{AIM}|<n-T0|$$

is met, and the UE 400 considers AIM 502 for its sensing process 408.

The UE determines the information contained in the AIM to concern the availability/non-availability of resources at times or time slots that overlap, at least in part, as illustrated at 504 so that at least the information about the resources in the overlapping time slots 504 may be used by the UE for the sensing process 408.

FIG. 7(*b*) illustrates an example in which the AIM 502 is received at the UE 400 between the time slot n and the end 200*b* of the sensing window 200. Again the condition $$|n-T_{AIM}|<|n-0|$$

is met. The sensing window 200' of the further UE 410 or UE 402 providing the AIM 502 fully overlaps 504 with the sensing window 200 so that UE 400 may use all information about the resources in the AIM 502 for the selection process.

FIG. 7(*c*) illustrates an example in which the AIM is not considered by the UE, despite the fact that it is received within the sensing window 200. The UE 400 determines that the sensing window 200' associated with the received AIM 502 includes information about resources, i.e., about the availability/non-availability thereof, at time slots that precede the sensing window 200, i.e., the resource information is considered to be outdated by the UE 400 and therefore is discarded. In other words, as is illustrated in FIG. 7(*c*), there is no overlap between the sensing window 200 of the UE 400 and the sensing window 200' of the further UE 410 from which the AIM was received so that despite the fact that the above-mentioned condition is met, due to the lack of overlap of time slots the UE 400 discards the resource information of AIM 502.

In accordance with embodiments, the UE 400 may consider an AIM received between the beginning 200*a* of the sensing window 200 and the time slot n only in case it is received at least a minimum time after the start 200*a* of the sensing window 200. As is illustrated, for example, in FIG. 7(*a*) above, the minimum time may be referred to as $T_{AIMvalid}=T_{AIM}-T0$. The minimum time $T_{AIMvalid}$ may be determined on the basis of the time the further UE 410 or UE 402 needs to generate and send the AIM 502 to the UE 400 and/or such that at least a partial overlap between the sensing window 200' used by the further UE 410 or UE 402 for generating the sensing results and the sensing window 200 of the UE 400 exists. For example, in FIG. 7(*c*) the time after the start 200*a* of the sensing window 200 at which the AIM 502 is received, is below the minimum time $T_{AIMvalid}$ so that the UE 400 judges that there is no overlap in the time resources and the information about the resources from AIM 502 may be discarded.

In accordance with further embodiments, the UE 400 may consider an AIM received between the beginning 200a of the sensing window 200 and the time slot n only in case it is received at least a minimum time before the time slot n at which the transmission is triggered. The minimum time may be referred to as $T_{AIMvalid}=n-T_{AIM}$. In accordance with embodiments, the UE 400 may consider an AIM received between the beginning 200a of the sensing window 200 and the time slot n only in case it is received at least a minimum time before the end of the sensing window 200b. The minimum time may be referred to as $T_{AIMvalid}=n-T_{proc,0}-T_{AIM}$.

In accordance with embodiments, the minimum time $T_{AIMvalid}$, may be configured or preconfigured at a system level, for example by the network, by a radio access network entity, like a base station or gNB. In accordance with other embodiments, it may be preconfigured in the UE 400 via a SIM card or it may be hardcoded in the UE 400. In accordance with yet other embodiments, the minimum time $T_{AIMvalid}$ may be defined on a resource pool level or a transmission level. For example, the minimum time $T_{AIMvalid}$ may be defined using the resource pool configuration. On the transmission level, the minimum time $T_{AIMvalid}$ may be defined in a control message for the transmission of a given transport block, TB, for example in a DCI or in a SCI.

Figure 8:
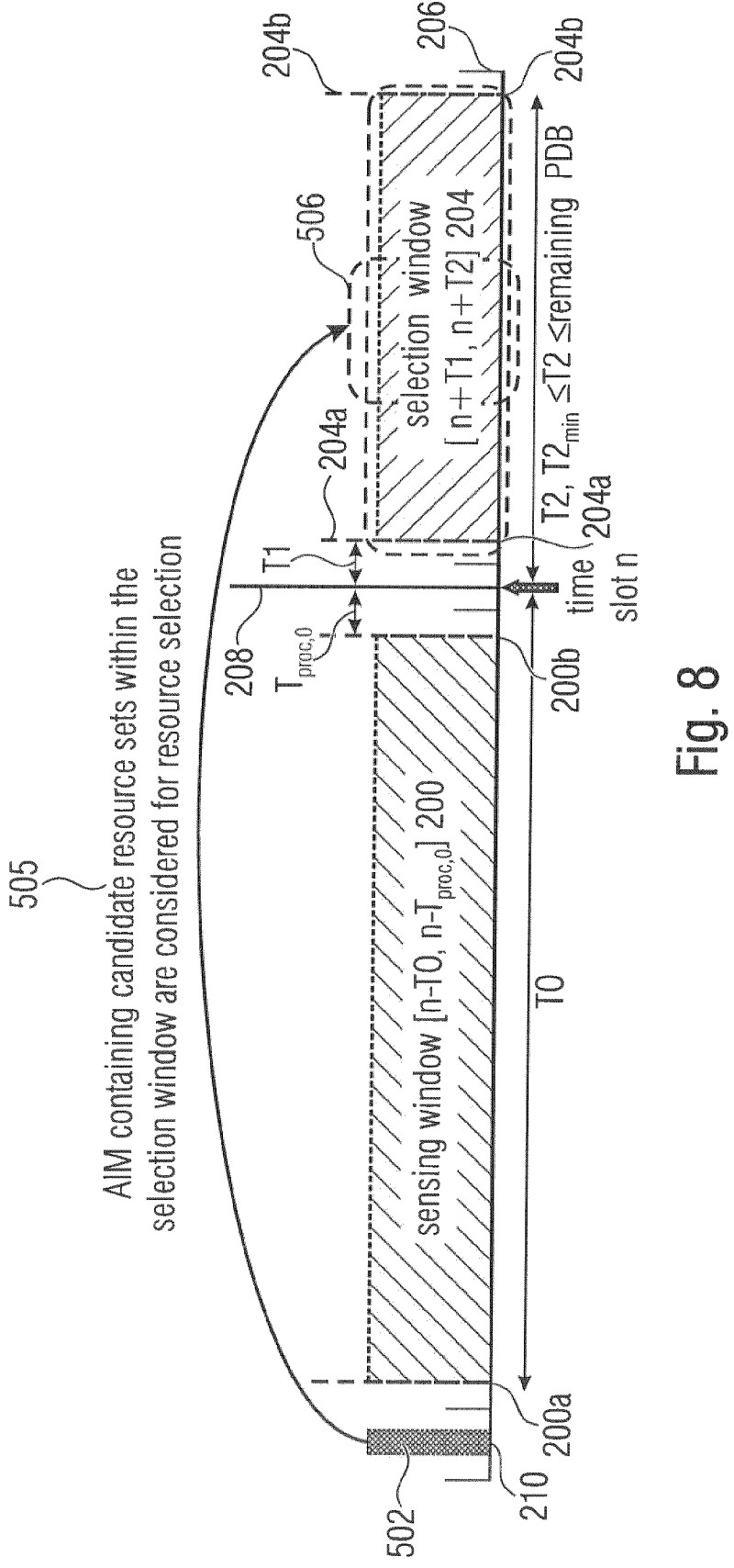
FIG. 8 illustrates an embodiment for receiving AIMs outside of a sensing window.

In accordance with further embodiments, in case a received AIM contains candidate resource sets or an exact resource or a set of resources for UE 400 to use as determined by a further UE 410 or UE 402, the AIM may be received at the UE within the sensing window 200 or even outside the sensing window. In accordance with such embodiments, UE 400 considers the information provided in such an AIM, even in case it was received before the start of the sensing window, in case the AIM includes candidate resource sets, or an exact resource or a set of resources, that pertain to time slots within the selection window of the UE. In other words, the further UE 410 or UE 402 generated an AIM containing a candidate resource set or an exact resource or a set of resources within a selection window of the further UE 410 or UE 402, and the further selection window partially or completely overlaps with the selection window of the UE 400. FIG. 8 illustrates an embodiment for receiving AIMs outside of the sensing window. FIG. 8 is similar to FIG. 6 and illustrates receipt of an AIM 502 ahead of the start 200a of the sensing window 200, however, it is assumed that the AIM, as is indicated at 505, contains candidate resource sets or an exact resource or a set of resources within the selection window 204 of the UE 400, i.e., resources in the selection window 204 as they are indicated at 506.

Figure 9:
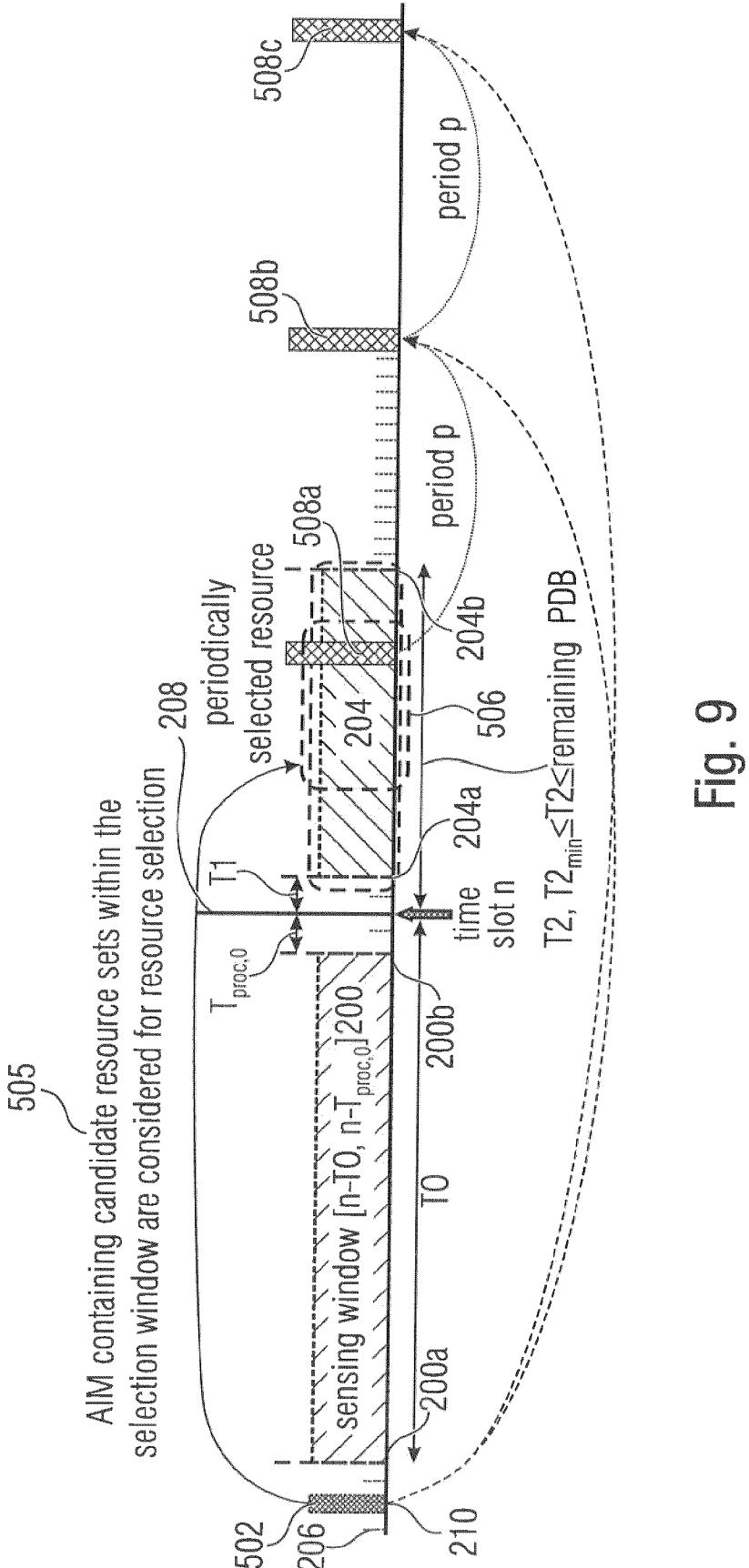
FIG. 9 illustrates the example of FIG. 8 with an AIM indicating periodic resources.

In accordance with further embodiments, an AIM received ahead of the time slot n may contain periodic resources selected by the further UE 410 or UE 402. Also when receiving such an AIM, UE 400 may apply the AIM for its sensing procedure 408, in case at least one or more of the selected future resources are within the UEs selection window 204, even in case the AIM contains further resources that are outside the selection window 204. FIG. 9 illustrates an example indicating, in addition to resource 508a within the selection window 204 of the UE 400, the additional resources 508b, 508c being repeated with a period p. The UE 400 selecting the multiple resources within a given period may be constrained to be allowed to choose this type of resource selection if at least one of the resources of the AIM is received for the given selection window 204 and in case the information provided by the AIM 502 approves the given resource, for example in case the value is below a predefined threshold.

Time Window within which the Received AIM is Relevant

In accordance with further embodiments, the UE may decide to use a received AIM dependent on whether the information contained within the AIM is based on a certain time window. The time window may be a sensing window or a selection window, dependent on the content of the AIM, i.e., whether it contains sensing results or candidate resource results or an exact resource or a set of resources.

When considering an AIM including sensing results, the resources indicated in a received AIM pertain to the sensing window that was used by the further UE 410 or UE 402 when generating the AIM. This further sensing window, namely the sensing window of the further UE 410 or UE 402, may be larger than, equal to or smaller than the sensing window of the UE 400. In accordance with embodiments, UE 400 considers the resource information in an AIM received from a further UE 410 or UE 402, in case the sensing window of the further UE 410 or UE 402 is partially or fully overlapping the sensing window of the UE 400, as already briefly mentioned above with reference to FIG. 7. In case of a partial overlap, the UE 400, in accordance with embodiments, only considers information about those resources at time slots overlapping with time slots of the sensing window of the UE 400, while outdated resource information outside the overlapping time slots are discarded.

In accordance with embodiments, discarding the information does not necessarily mean that the information from the received AIM is deleted or removed, but it means that it is not used for the sensing process 408 for the current transmission that was triggered at time slot n. In other words, the UE may discard the resources outside the partial overlap only with respect to the current transmission, however, for a following transmission, like at a time slot n+5, the sensing window of the UE 400 may be different and the overlap of the sensing window of the already received AIM with the new sensing window of the UE 400 may also be different so that information on some resources not used for the transmission at the time slot n may now be valid and therefore the UE may use this information for a later transmission. Thus, in accordance with embodiments, UE 400, when discarding information, may maintain the information for potential later transmissions.

Figures 10A, 10B, 10C, 10D:
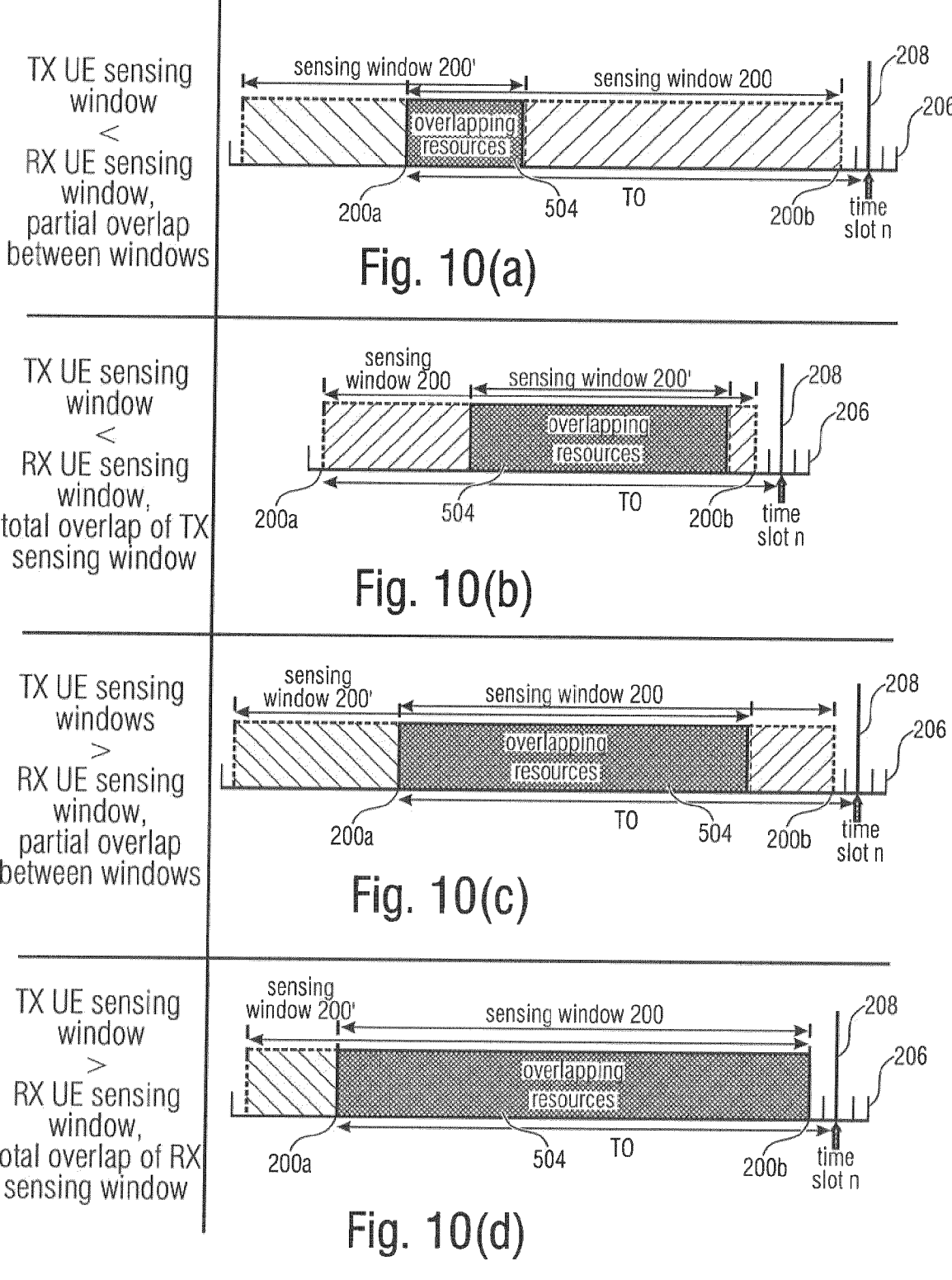
FIG. 10 illustrates examples of different sizes of sensing windows of a further UE.

FIG. 10 illustrates examples of different sizes of sensing windows of the further UE 410 or UE 402. In FIG. 10, the left part of the diagrams of FIG. 6 and FIG. 8 is illustrated, i.e., the time period before the time slot n at which the transmission is triggered. FIG. 10 illustrates the sensing window 200 of the UE 400 as well as the sensing window 200' of a further UE 410 or UE 402 that provided an AIM including sensing results obtained by the further UE 410 or UE 402 during the sensing window 200'.

FIG. 10(*a*) illustrates a scenario in which the sensing windows 200, 200' partially overlap, as is indicated at 504, i.e., for the time slots during the time period 504, the information about the availability/non-availability of the resources may be used by UE 400 for its sensing process. The sensing window 200' is smaller than the sensing window 200 of the UE 400, and a part of the time slots for which information for the respective resources are provided, overlaps. In accordance with embodiments, the AIM may provide a time stamp indicating the time slots at which for certain resources the information about the availability/non-availability was determined, and on the basis of these time stamps UE 400 may determine a full, partial or no overlap between the time slots of the sensing window 200 and the sensing window 200'.

FIG. 10(*b*) illustrates a scenario in which the sensing window 200' of the further UE 410 or UE 402 is smaller than the sensing window 200 of the UE 400, however, the sensing window 200' includes information for time slots that are all within the time slots 504 of the sensing window 200 of UE 400, so that the sensing window 200' fully or totally overlaps with the sensing window 200 of the UE 400.

FIG. 10(*c*) illustrates a scenario in which the sensing window 200' of the further UE 410 or UE 402 is greater than the sensing window 200 of the UE 400. As is indicated at 504, the AIM provided by the further UE 410 or UE 402 includes information about the resources for the overlap region 504, i.e., there's a partial overlap between the sensing windows.

FIG. 10(*d*) illustrates an embodiment in which the sensing window 200' of the further UE 410 is greater than the sensing window 200 of the UE 400 with a complete overlap of the sensing window 200 of the UE 400 with the sensing window 200', as is indicated at 504.

Figures 11A, 11B, 11C, 11D:
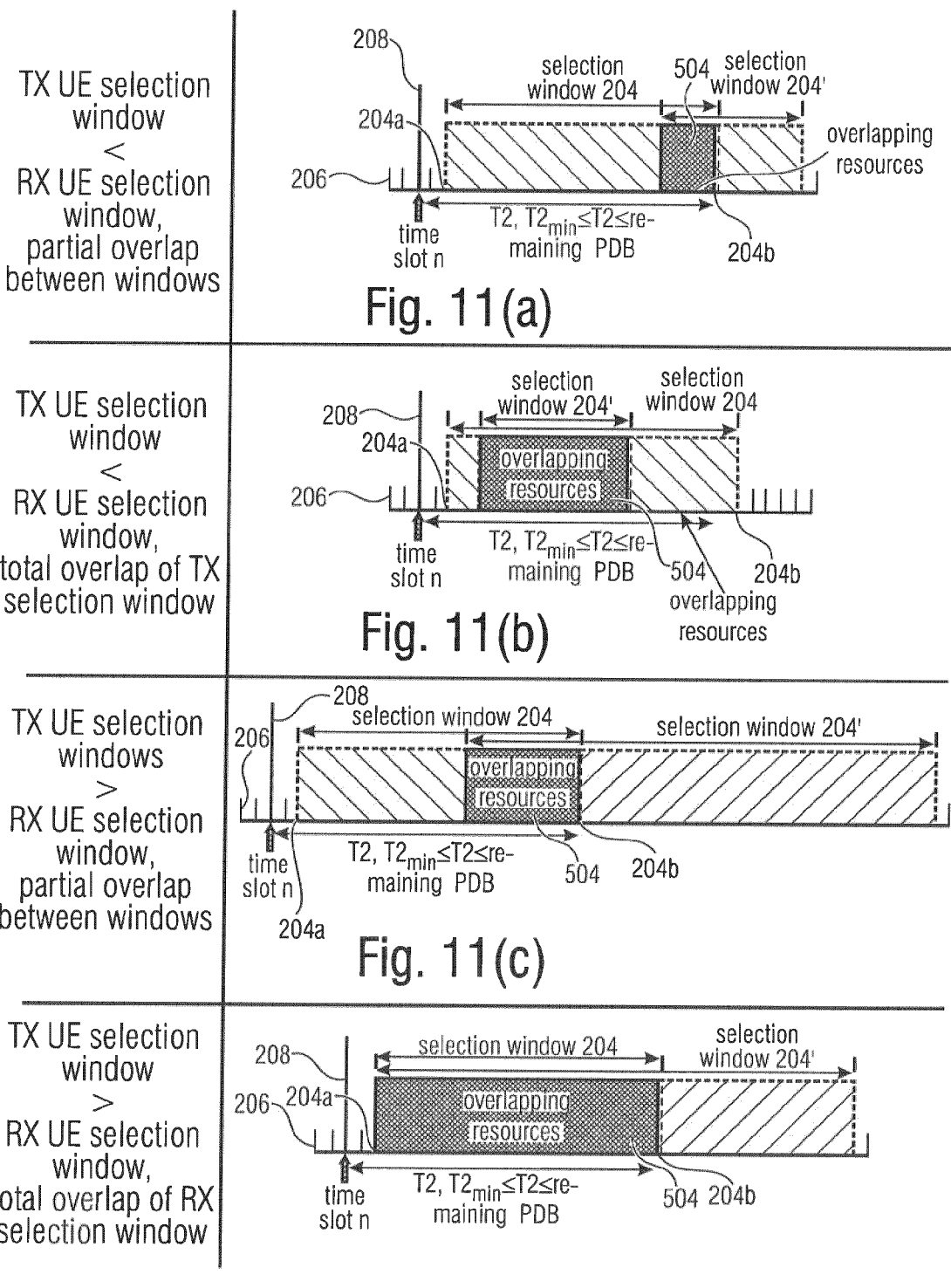
FIG. 11 illustrates examples of different sizes of selection windows of a further UE.

In case an AIM contains information about a candidate resource set or an exact resource or a set of resources, this candidate resource set or exact resource or set of resources as indicated in the AIM may pertain to a selection window that was used by the further UE 410 or UE 402 when generating the AIM and that may be different from the selection window of the UE 400, i.e., the selection window of the further UE 410 or UE 402 providing the AIM may be larger than, equal to or smaller than the selection window of the UE 400. Therefore, in accordance with embodiments, the UE 400 considers the resource information in an AIM including a candidate resource set or an exact resource or a set of resources in case a selection window of the further UE 410 or UE 402 is partially or fully overlapping with the selection window of the UE 400. In case of partially overlapping selection windows, in accordance with embodiments, UE 400 considers only resource information inside the overlapping portion or inside the overlapping time slots, while resource information outside the overlapping time slots is discarded. Also in the embodiments concerning AIMs containing a candidate resource set or an exact resource or a set of resources, discarding the resource information outside the overlapping time slots, in accordance with embodiments, means that this information is not used, i.e., it is only discarded with respect to the current transmission. However, resource information that is outside the overlapping region for the current transmission, like being outside the selection window of the current transport block, may be used by the UE 400 for a later transmission. FIG. 11 illustrates different sizes of selection windows. FIG. 11 illustrates at the right part of FIG. 6 and FIG. 8, i.e., the time period following the time slot n at which the transmission or current transmission is triggered. Further, the selection window 204 of the UE 400 is illustrated, as well as the further UE's selection window 204' and the partial or fully overlapping resources 504.

FIG. 11(*a*) illustrates a scenario in which the selection window 204' of the further UE 410 or UE 402 is smaller than the selection window 204 of the UE 400, causing the partial overlap 504 between the respective windows. Thus, UE 400 uses resource information for the time slots in the overlapping region 504 but does not make use of the resource information for time slots associated with the rest of the selection window 204'.

FIG. 11(*b*) illustrates a scenario in which the selection window 204' of the further UE 410 or UE 402 is smaller than the selection window 204 of the UE 400 yielding a total overlap of the selection window 204' with the selection window 204 of the UE 400 so that all resource information from the selection window 204' are considered by the UE 400 for the sensing process 408.

FIG. 11(*c*) illustrates a scenario in which a selection window 204' of the further UE 410 or UE 402 is larger than the selection window 200 of the UE 400 so that the windows partially overlap, and then UE, as in FIG. 11(*a*) only uses resource information associated with time slots in the overlapping region 504.

FIG. 11(*d*) illustrates a scenario in which the selection window 204' of the further UE 410 or UE 402 is larger than the selection window 204 of the UE 400, so that the selection window 204 fully overlaps with the selection window 204', however, the AIM only uses the information from the AIM that is associated with time slots in the overlap region 504. Expiry Timer In accordance with further embodiments, UE 400 may consider a received AIM on the basis of an expiry timer associated with the received AIM. In other words, the report or AIM including the resource information for certain time slots corresponding to the sensing window and/or selection window of the UE 400 used for the sensing process 408 may be associated with an expiry timer and, as long as the expiry timer or the timer value thereof has not expired, UE 400 considers the AIM for the sensing process 408. The timer value of the expiry timer counts down a validity of the AIM, and, in accordance with embodiments, the timer value may be in units OFDM symbols, time slots, subframes, frames, seconds, milliseconds or the like.

The expiry timer may be provided or set either by the further UE 410 or UE 402 sending the AIM or it may be set by the UE 400 upon receiving an AIM.

In case the expiry timer is set by the UE providing the AIM, the UE 400 obtains a timer value, in accordance with embodiments, from a control message associated with the AIM. The control message may be a PC5 RRC message, a SCI, for example a first stage SCI and/or a second stage SCI, or a sidelink information block, SLIB. It is also possible that the timer information is included in the AIM transmitted in the PSSCH, as part of a data packet. Responsive to receiving the AIM and the associated timer value, UE 400 may start a timer countdown or, in accordance with other embodiments, may modify the timer value responsive to one or more conditions and start the modified timer countdown.

In accordance with other embodiments, the AIM may not be provided by the further UE 410 or UE 402 with the timer, rather, the expiry timer may be set by the UE 400 when receiving the AIM, and the UE 400 may start the timer countdown once it received the AIM from the further UE 410 or UE 402.

The value of the timer or the time value of the expiry timer is set by the further UE 410 or UE 402 providing the AIM or is modified by the UE 400 or is set by the UE 400 dependent on certain criteria, like the content of the AIM, a channel condition between the UE 400 and the further UE 410 or UE 402 providing the AIM, a priority or a quality of service, QoS, level of the AIM transmission, a resource pool occupation, a resource pool configuration parameter, a distance between the UE and the further UE 410 providing the AIM.

Figure 12:
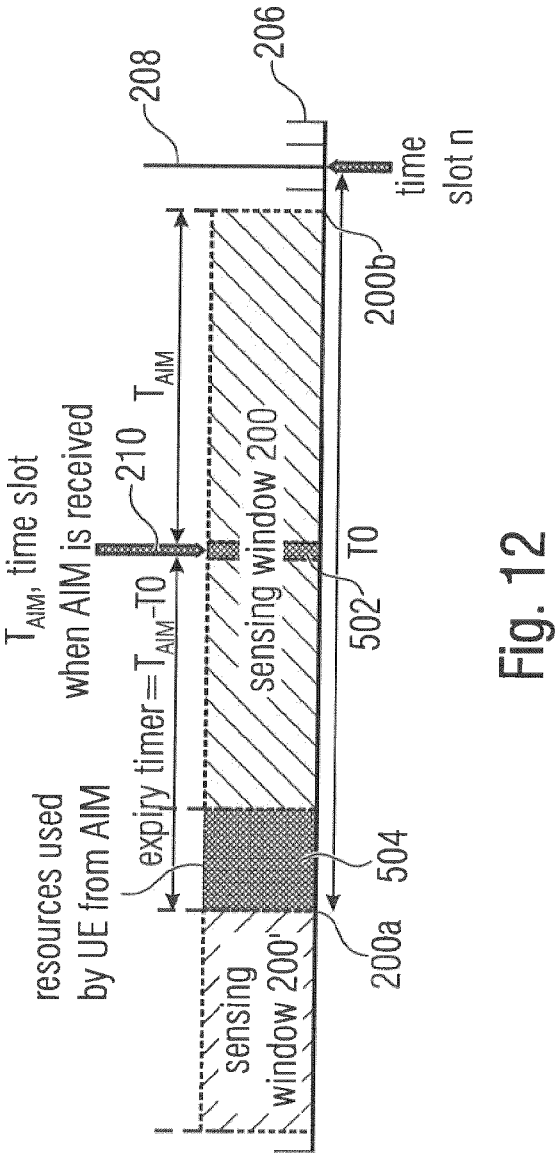
FIG. 12 illustrates an embodiment for setting the expiry timer dependent on the content of the AIM, when the AIM includes sensing results.

In accordance with embodiments, the timer value of the expiry timer depends on or is modified dependent on the content of the AIM. If the AIM contains sensing results, the expiry timer indicates a value based on the sensing window. For example, in case the UE 400 sets or modifies the expiry timer, UE 400 may set the expiry timer to rest of the sensing window of the UE 400, starting from the time the UE 400 received the AIM. FIG. 12 illustrates an embodiment for setting the expiry timer dependent on the content of the AIM, when the AIM includes sensing results. FIG. 12, like FIG. 10, illustrates the time period before the time slot n and the AIM 502 is received at a time 210 ahead of time slot n within the sensing window 200 of UE 400. FIG. 12 also illustrates the sensing window 200' of the further UE 410 or UE 402. The expiry timer is set to a value of $T_{AIM}$–T0 which is the time period between the start 200a of the sensing window 200 of UE 400 and the time slot 210 at which the AIM 502 is received.

Figure 13:
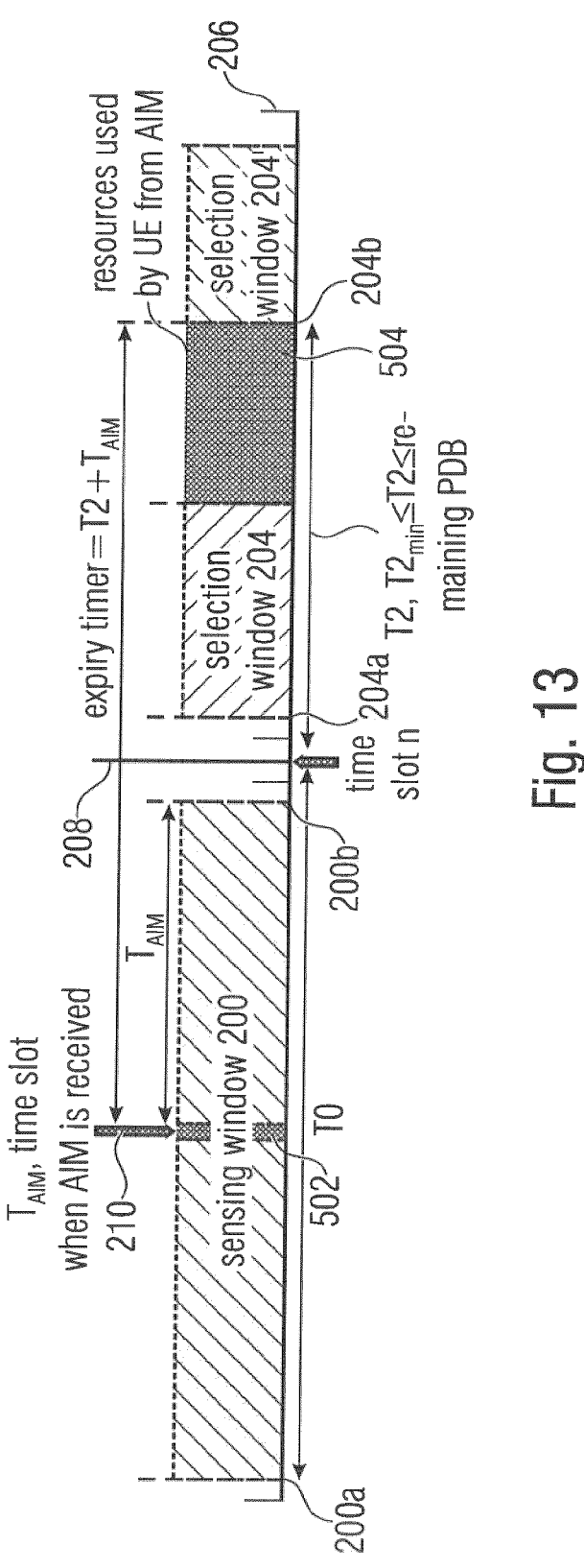
FIG. 13 illustrates a diagram showing the expiry timer in case of an AIM including candidate resource sets.

In case the AIM contains a candidate resource set or an exact resource or a set of resources, the expiry timer may indicate a value based on the selection window. For example, in case the UE 400 sets the expiry timer, it may be set to the reminder or rest of the selection window of the UE 400, from the time the UE 400 received the AIM. FIG. 13 illustrates a diagram showing the expiry timer in case of an AIM including candidate resource sets or an exact resource or a set of resources. FIG. 13 illustrates the time slot n at which the transmission is triggered and the associated sensing window 200 and selection window 204 used by UE 400 for the sensing procedure 408. At a time 210 within the sensing window 200, the AIM 502 is received from a further UE 410 or UE 402 which includes information about a candidate resource set or an exact resource or a set of resources, and in accordance with the present embodiment, UE 400 sets the expiry timer to be T2+$T_{AIM}$ thereby defining the overlapping region 504 during which resource information from the AIM 502 are used by UE 400.

In accordance with other embodiments, the timer value of the expiry timer may depend on or may be modified dependent on a channel condition between the UE 400 and a further UE 410 or UE 402 providing the AIM. For example, a volatility of the channel conditions may be taken into account so that, if the channel conditions between the UE 400 and the further UE 410 or UE 402 are volatile and constantly changing the expiry timer may be set to a small value while, in case the channel conditions are stable, the expiry timer may be set to a larger value because the information in the AIM is relevant to the UE 400 only as long as the channel conditions also hold. Thus, in accordance with embodiments, the timer value may be set to a first value when changes of a channel condition between the UE 400 and a further UE 410 or UE 402 during a certain time period are outside predefined boundaries, and it may be set to a second, longer value when the changes are within the predefined boundaries.

In accordance with other embodiments, the pathloss or received power or interference condition on the channel may be taken into consideration. The UE 400 may estimate a pathloss or received power of the AIM transmission or an average of the pathloss and received power of a certain time window so as to determine the expiry time value. For example, a smaller pathloss or a higher received power may cause the expiry timer to be set to a longer value while a higher interference condition may result in a shorter expiry timer. In other words, when estimating the pathloss or the received power of the AIM transmission or when averaging these measurements over a time window, the UE sets the timer value to a first value when the pathloss is between a first threshold and/or the received power is above a second threshold, and sets the timer value to a second, shorter value when the pathloss is above the first threshold and/or the received power is below a second threshold which, for example, is indicative of an interference condition indicating an interference above a certain level.

In accordance with yet other embodiments, the UE may also determine the expiry timer on the basis of the channel aging so that, for example, the expiry timer counts down quicker in case an AIM is getting older. In other words, the UE may determine an aging of a channel between the UE 400 and the AIM source, like the further UE 410 or UE 402, and reduces the timer value or increases an increment of the set expiry timer when the channel aging is at or above a predefined threshold. The age of the channel is the time that has elapsed since the AIM was received with certain channel conditions. Instead of just aging it by a simple timer in a linear manner, a weight or multiplier may be used to consider the age of the channel, once it is above a configured or pre-configured threshold.

In accordance with further embodiments, the timer value of the expiry timer may depend on or may be modified dependent on a priority or a QoS level of the AIM transmission. The further UE 410 or UE 402 providing the AIM may indicate a certain priority or QoS for the AIM transmission and on the basis of this information, the value of the expiry timer may be calculated. For example, a lower priority value associated with the AIM transmission may result in a longer expiry timer. In other words, the UE sets the timer to a first value when the priority or QoS level is below a threshold and to a second value, shorter than the first value when the priority or QoS level is about the threshold.

In accordance with the yet further embodiments, the expiry timer may depend on or may be modified dependent on a resource pool occupation, for example by considering a channel busy ratio. For example, when the channel busy ratio or another occupation report indicates that the resource pool, like the sidelink resource pool including the resources indicated in the AIM, or any other resource pool, reached a certain level of occupation, the expiry timer may be set to a smaller value as it is harder to predict far into the future. In other words, when the resource pool occupation is above a threshold, the UE 400 may set the timer value to a first value, and when it is below the threshold, the timer value may be set to a second, longer value.

In accordance with other embodiments, the value of the expiry timer may be explicitly configured to the UE 400 using a resource pool configuration. For example, the value of the expiry timer may be configured to a single value for all AIMs that are received within a given resource pool. This value is then indicated in the resource pool configuration, removing the need for the timer value to be indicated for each specific transmission of an AIM. In accordance with further embodiments, the value of the expiry timer may be used in combination with other parameters to determine the expiry timer of a specific AIM content. For example, a value of the expiry timer indicated in the resource pool configuration may be used as a starting point, with an increment or decrement in the expiry timer possible by taking into account the content of the AIM, a channel condition between the UE 400 and the further UE 410 or UE 402 providing the AIM, a priority or a quality of service, QoS, level of the AIM transmission, a resource pool occupation, or a distance between the UE and the further UE 410 providing the AIM.

In accordance with yet further embodiments, the timer value of the expiry timer may depend on or may be modified dependent on a distance between the UE 400 and the UE providing the AIM. For example, if the UE 400 and the further UE 410 or UE 402 are close to each other, the expiry timer value may be long while, in case the further UE 410 and the UE 400 are far away from each other, the expiry timer may be short. In other words, the UE 400 may set the timer value to a first value when a distance between the UE 400 and the further UE 410 is above a threshold, and it may be set to a second, shorter value when the distance is below the threshold.

In accordance with even further embodiments, in case the UE 400 operates in a DRX mode, the expiry timer may be paused when the UE is not receiving.

In accordance with the yet further embodiments, the expiry timer may be terminated, for example, by setting the timer value to 0 or by immediately invalidating a received AIM, in case a second AIM from the same or another further UE 410 or UE 402 is received that pertains to some or all of the resources also indicated in the first AIM. In case the first and second AIMs are provided by the same UE, for example, the UE provides the first AIM with sensing/candidate resources pertaining to a given priority, and the second AIM pertains to a priority value higher or lower than that of the first AIM for the same time slots. If the second AIM is more relevant to the triggered transmission, the first AIM is not considered.

In accordance with further embodiments, the termination of a current AIM when receiving a second AIM may be done dependent on a hierarchy of the AIM source, like the further UE 410 or UE 402, from which the second AIM stems so that, when receiving AIMs pertaining to some or all of the resources indicated in a first AIM come from a different UE having a hierarchy higher than the hierarchy of a further UE 410 or UE 402 provided by the first AIM.

In accordance with yet other embodiments of the present invention, a current or first AIM may be terminated or no longer considered by the UE 400 in case a second AIM pertaining to the same or at least some of the same resources as indicated in the first AIM is received from the same or from another further UE 410 or UE 402, independent on whether an expiry timer is provided or not. Also, in this case, the first AIM may no longer be used or terminated in case the hierarchy of the further UE 410 or UE 402 providing the second AIM is higher than the hierarchy of the UE providing the first AIM.

For example, the hierarchy of the further UEs 410 or UE 402 providing the AIM may be as follows: gNB, roadside unit, RSU, group leader, GL, UE, member UE (UE being a member of a group), intended recipient of the transmission, receiving UE, UE capabilities, like a UE supporting beam-forming within a particular direction. The above hierarchy levels may also be combined by associated certain weights with them, so as to determine an overall hierarchy level of a UE transmitting the AIM.

As described above, discarding an AIM may mean that the AIM's content is not used for a current transmission the UE performs but may be used for another, e.g., later transmission. In accordance with embodiments, this is also the case when referring to invalidating an AIM. Invalidating the AIM may mean that it is valid only for the current transmission. For each transmission, the UE may evaluate a received AIM pertaining to the same set of resources, and decides whether to consider the AIM or not. For example, considering the case where an AIM received contains resources pertaining to a first priority value, say priority level 5, if the transmission of the packet for which the UE is currently carrying out resource selection is of priority 2, the UE does not consider the AIM. However, for a subsequent transmission of a packet for which the UE is carrying out resource selection and which has a priority 5, the UE considers the AIM.

QoS Level/Priority Value Associated with the AIM

In accordance with further embodiments of the present invention, a condition on the basis of which UE 400 considers an AIM or not may be associated with a priority value associated with the AIM. In the case of priority, the lowest priority value of 1 indicates the highest priority for a transmission, while the highest priority value of 8 indicates the lowest priority for a transmission. For example, when the AIM received from a further UE 410 or UE 402 has associated therewith a priority value that is less than or equal to a priority value of the transmission triggered by the UE 400 and for which the sensing process is carried out, UE 400 may consider all resources indicated in the AIM as being available to be usable for the triggered transmission. This is because the resources indicated in the AIM, associated with a higher priority, which is mapped to the lower priority value associated with the AIM, may be used by the UE 400 for the triggered transmission requiring resources with a lower priority, which is mapped to a higher priority value. For example, in case the AIM includes information about resources associated with a transmission by the further UE 410 or UE 402 of low priority, which is mapped to a high priority value, and in case the transmission triggered by the UE 400 has a high priority, which is mapped to a low priority value, like an emergency message, the resources indicated in the AIM are not used by the UE 400 as these resources do not meet the requirements required for the triggered transmission. A priority value may also be configured or pre-defined at a system, resource pool or transmission level that determines whether an AIM received from a further UE 410 or UE 402 may be used by UE 400 for a triggered transmission.

In accordance with embodiments, a condition on the basis of which UE 400 considers an AIM or not may be associated with a QoS level associated with the AIM. The QoS level is an indicator that takes into account multiple factors that include the priority, latency and reliability requirements of the transmission. For example, when the AIM received from a further UE 410 or UE 402 has associated therewith a QoS level that is higher than or equal to the QoS level of the transmission triggered by the UE 400 and for which the sensing process is carried out, UE 400 may consider all resources indicated in the AIM as being available to be usable for the triggered transmission. A QoS level may also be configured or pre-defined at a system, resource pool or transmission level that determines whether an AIM received from a further UE 410 or UE 402 may be used by UE 400 for a triggered transmission.

Distance Between the UE and the Further UE

In accordance with yet further embodiments, UE 400 may consider an AIM received from a certain UE dependent on a distance between the UE 400 and the further UE 410 or UE 402. For example, when the UE is at a certain distance, it is likely that a transmission power on the resources indicated in the AIM is already low, so that the interference experienced may be negligible, especially in case the UE 400 transmits within a short range to a nearby receiver. In that case, despite the fact that the AIM from the further UE 410 or UE 402 being far away indicates unavailable resources, the UE 400 may disregard this AIM because due to the large distance, the interference or influence of the transmission on these resources on the UEs transmission are considered to be low so that still a reliable transmission to the receiver is possible. Hence if the UE 400 intends to transmit to a receiver UE, it considers the AIM from the further UE 410 or UE 402 as long as it is inside a configured or pre-defined range associated with the transmission. The range may also be configured or pre-defined at a system, resource pool or transmission level that determines whether an AIM received from a further UE 410 or UE 402 may be used by UE 400 for a triggered transmission.

Identification Associated with the AIM

Figure 14:
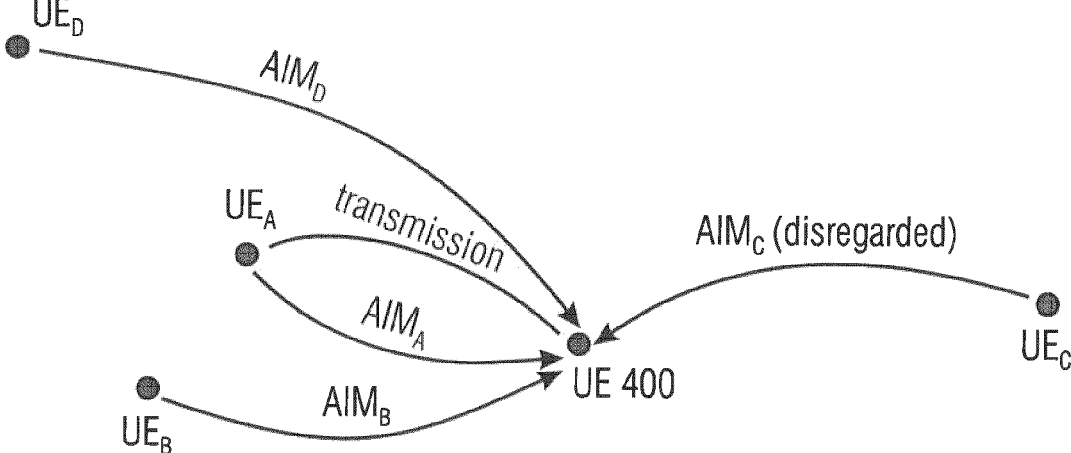
FIG. 14 illustrates an embodiment using an identification associated with the AIM for deciding whether to consider an AIM or not.

In accordance with yet further embodiments, the UE 400 may determine to consider or not consider an AIM received from a further UE 410 or UE 402 dependent on a certain identification associated with the AIM, like a source ID or a group ID. For example, the UE 400 may consider an AIM indicating a further UE 410 or UE 402 or a group of further UEs 410 to which the transmission is to be directed, while it may disregard an AIM received from other further UEs 410 or UE 402. FIG. 14 illustrates an embodiment using an identification associated with the AIM. Assuming UE 400 is to transmit the trigger transmission towards $UE_A$, for example, by beamforming or the like, UE 400 may consider AIMs received from $UE_A$ or from other UEs positioned in the same direction, like $UE_B$, while disregarding an AIM received from a UE, like $UE_C$ located in a different direction into which the UE 400 does not transmit. The AIMs considered by UE 400 may be either AIMs from certain UEs having associated a known source ID indicating where they are positioned, or they may include a group ID indicating a group of UEs including the UE to which the transmission from the UE 400 is directed. In FIG. 14, an AIM from $UE_D$ that is located far away from UE 400 may be disregarded, as explained above.

Further Embodiments

In accordance with embodiments, UE 400 may obtain AIMs from one or more further UEs 410 or UE 402. In accordance with other embodiments, UE 400 may request the one or more AIMs dependent on certain situations, like a situation in which a high reliability and/or low latency and/or high priority transmission is required, or in case no sensing results are available at the UE 400, or in case the power level of the UE 400 is below a certain threshold, or in case the UE 400 decides to improve its power consumption or the like. In accordance with further embodiments, UE 400 may also receive an AIM at periodic intervals or responsive to one or more implicit events. The UE may perform the sensing process 408, when considering the one or more AIMs, either on the basis of the resource information included only in the AIMs or on the basis of recent information obtained by the sensing process and obtained from the received AIMs.

In accordance with further embodiments, UE 400 may obtain AIMs from one or more further UEs 410 or UE 402 at periodic intervals, and/or responsive to one or more implicit events.

In accordance with other embodiments, when receiving the one or more AIMs containing the resource allocation related assistance information indicating a candidate resource set or a resource or a set of specific resources, meant to be used by the UE for its transmission, the UE is does not carry out the sensing procedure during the sensing window, but provides to the higher layers the candidate resource set from the one or more AIMs for a random resource selection, or selects the set of specific resources from the one or more AIMs.

In accordance with other embodiments, when receiving the one or more AIMs, the UE selects the resources during the selection window by taking into consideration the sensing results obtained by the UE during the sensing window and the resource allocation related assistance information included in the one or more AIMs.

In accordance with other embodiments, the resource allocation related assistance information indicates resources available, and the indicated resources may be in the form of one or more of the following:

one or more resources within a resource pool to be used for transmission by the UE to the one or more further UEs, for periodic transmissions, e.g., semi-persistent transmissions, or for aperiodic transmissions, e.g., one-shot transmissions, interference information, e.g., RSRQ or SINR reports, a sensing report, e.g., a zonal area resource usage map, ZARUM.

In accordance with other embodiments, the AIM indicates the resources in any one of the following manners:

by a list of all resource blocks, RBs, that are available in one or more time slots, by a list of all resource blocks, RBs, that are unavailable in one or more time slots, by a list of resource blocks, RBs, for which collisions are expected, e.g., a list of reserved resources where the further UE is expected to transmit as well.

The AIM may indicate the resources across time in any one of the following manners:

by a bitmap across time, the bitmap indicating resources, like OFDM symbols or time slots or subframes or frames, where the resource set is defined, spanning either a portion or the entire length of the one BWP, by a starting resource, like a time slot or a subframe, and a duration of the resource set, by explicit resources numbers, like time slot or subframe numbers, by puncturing out resources mentioned explicitly or that are part of another set of resources or RP, by a starting resource, and periodic offsets for subsequent occurrences, by a pattern of symbols, time slots or subframes or frames, by a formula used to define the time resource indicator value, TRIV, defined in TS38.214 as follows:

```
if N = 1
    TRIV = 0
elseif N = 2
    TRIV = t₁
else
    if (t₂ – t₁ – 1) ≤ 15
        TRIV = 30 (t₂ – t₁ – 1) + t₁ + 31
    else
        TRIV = 30 (31 – t₂ + t₁) + 62 – t₁
    end if
end if
``` where,

N indicates the number of time slots indicated by the AIM, where 0 means the time slot where the AIM was received, 1 means the time slot where the AIM was received as well as one more future time slot with respect to the time slot the AIM was received, 2 means the time slot where the AIM was received as well as two more future time slots with respect to the time slot the AIM was received, $t_1$ indicates the first future resource time slot with respect to the time slot the AIM was received, and $t_2$ indicates the second future resource time slot with respect to the time slot the AIM was received.

The AIM may indicate may indicate the resources across frequency in any one of the following manners:

by a bitmap, the bitmap the bitmap indicating resources, like resource blocks, across the one BWP, by a starting resource, like a resource block, and a number of resources for a resource set, by multiple starting resources, like resource blocks, and ending resources, if the resource set is non-contiguous over frequency, by explicit resource indices, like resource block indices, by puncturing out resources mentioned explicitly or that are part of another set of resources or RP, by a starting resource, and periodic offsets for subsequent occurrences, by a pattern of resource blocks or subchannels, by a formula used to define the frequency resource indicator value, FRIV, defined in TS38.214 as follows:

$$FRIV = n_{subCH,1}^{start} + \sum_{i=1}^{L_{subCH}-1} \left(N_{subchannel}^{SL} + 1 - i\right)$$

The AIM may indicate the resources across time and frequency in any one of the following manners:

by a matrix, the matrix indicating the resources across time, like symbols, time slots or subframes or frames, and across frequency, like resource blocks or subchannels, by a pattern, the pattern indicating the resources across time, like symbols, time slots or subframes or frames, and across frequency, like resource blocks or subchannels.

In accordance with embodiments, the UE 400 may receive the one or more AIMs in one or more of the following methods:

using a configuration message, like a PC5 RRC configuration or MAC CE message, in a unicast, multicast, groupcast or broadcast manner, or as a part of a control message, like a SCI, e.g., contained within a 2nd-stage SCI, the SCI including fields informing the further UE (UE-B) about the content of the AIM, or as a part of a data transmission, which is indicated by parameters in the accompanying control message, like a SCI, or as an information block, e.g., in the PSSCH as a sidelink information block, SLIB.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

Although some of the embodiments above are described with reference to a Mode 2 UE, it is noted that the present invention is not limited to such embodiments. The teachings of the present invention as descried herein are equally applicable to Mode 1 UEs carrying out sensing to obtain, e.g., a sensing report for providing an occupancy status of one or more resources or resource sets.

Although some of the embodiments above are described with reference to a sidelink pool, it is noted that the present invention is not limited to such embodiments. Rather, the inventive approach may be implemented in a system or network providing a set or resources to be used for a certain communication between UEs in the network, and the above described subset of time resources or SSW according to the present invention has a number of time resources that is less than the total number of resources within the set of resources.

The time resource may be a number of time slots, subframe, radio frames, radio resources in time, a number of PRBs in time domain, also spanning a frequency, subchannel, BWP, etc.

The set of resources may be preconfigured so that the entities of the network are aware of the set of resources provided by the network, or the entities may be configured by the network with the set of resources.

Thus, the set of resources provided by the network may be defined as one or more of the following:

a sidelink resource pool, to be used by the UE for sidelink communications, e.g. direct UE-to-UE communication via PC5, a configured grant including or consisting of resources to be used by the UE for NR-U communications, a configured grant including or consisting of resources to be used a reduced capability UE.

In accordance with embodiments, the set or resources may include one or more sensing regions, e.g., regions per resource pool or per TX/RX resource pool for Mode 1 and/or Mode 2 UEs. A UE may be configured or preconfigured with the one or more sensing regions by the wireless communication network, and the one or more subsets are defined within the one or more sensing regions. For example, a sensing region may span a certain time interval.

In accordance with embodiments, the wireless communication system may include a terrestrial network, or a non-terrestrial network, or networks or segments of networks using as a receiver an airborne vehicle or a space-borne vehicle, or a combination thereof.

In accordance with embodiments of the present invention, the UE and/or the further UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a base station e.g. gNB, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a transceiver, or any sidelink capable network entity.

In accordance with embodiments of the present invention, a network entity comprises one or more of the following: a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 15:
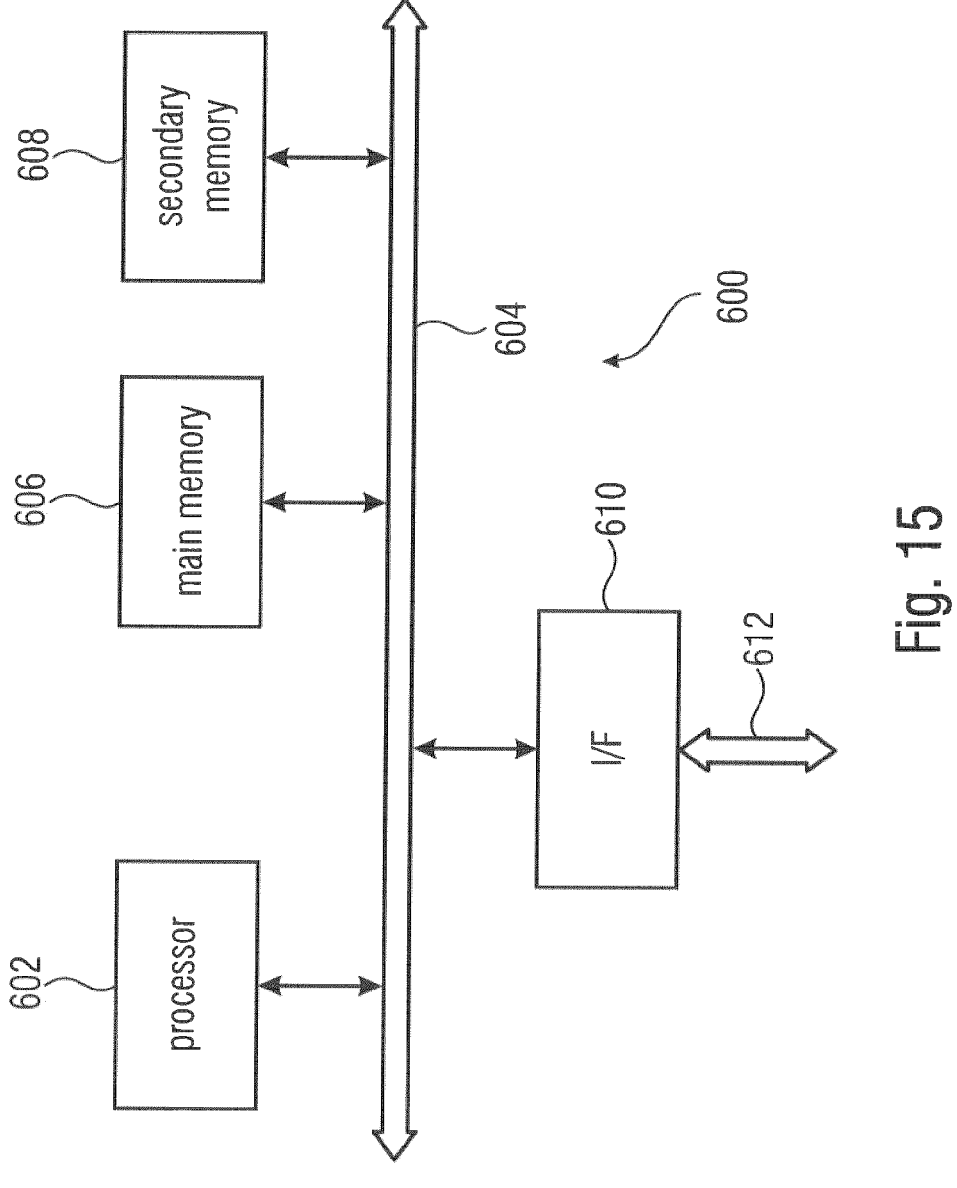
FIG. 15 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 15 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

The invention claimed is:

1. A device comprising:
a processor circuit; and
a memory circuit, wherein the memory circuit is arrange to store instructions for the processor circuit,
wherein the processor circuit is arranged to obtain a candidate resource set for the transmission by selecting resources for a transmission within a selection window in response to a trigger, wherein the selection window follows the trigger, wherein the processor circuit is arranged to select the resources based on sensing results, wherein the sensing results are obtained during a sensing window preceding the trigger, wherein the sensing results indicate whether certain resources are available or unavailable, wherein the processor circuit is arranged to receive from at least one user device(s) at least one report or assistance information message, wherein assistance information message comprise resource allocation related assistance information, wherein the processor circuit is arranged to use the report or assistance information message for selecting resources when one or more predefined conditions are met, wherein the resource allocation related assistance information indicates sensing results during a second sensing window, wherein the processor circuit is arranged to use the assistance information message when the sensing window and the second sensing window overlap.

2. The device of claim 1, wherein the processor circuit is arranged to communicate with the least one user device(s) using a sidelink interface and/or at least one radio access network.

3. The device of claim 1, wherein the predefined conditions are selected from the group consisting of a time at which the report or assistance information message is received at the UE, a time window within which resources indicated in the reports or assistance information message are valid, an expiry timer, a priority value associated with the assistance information message is less than or equal to a priority value transmission, a QoS level associated with the assistance information message is higher than or equal to a QoS level which is associated with the triggered transmission, a distance being within a range, an identification associated with the assistance information message.

4. The device of claim 1, wherein the resource allocation related assistance information indicates sensing results, wherein the processor circuit is arranged to use the assistance information message when the assistance information message is received prior to the trigger for the transmission within the sensing window or between an end of the sensing window and the trigger for the transmission.

5. The device of claim 4, wherein the processor circuit is arranged to use the assistance information message when the assistance information message is received at least a minimum time after the start of the sensing window.

6. The device of claim 4, wherein the processor circuit is arranged to use the assistance information message when the assistance information message is received a minimum time before the trigger for the transmission or before the end of the sensing window.

7. The device of claim 5, wherein the minimum time accounts for the time taken to generate and send the assistance information message and/or at least a partial overlap between the sensing window used to generate the sensing results and the sensing window.

8. The device of claim 7, wherein the minimum time is configured a system level, and/or a resource pool level and/or a transmission level.

9. The device of claim 1, wherein the resource allocation related assistance information indicates a candidate resource set or a set of specific resources, wherein the candidate resource set or a set of specific resources is used for transmission, wherein the candidate resource set or a set of specific resources comprises at least one resource within the selection window, wherein the processor circuit is arranged to use the assistance information message when the assistance information message is received at any time prior to the trigger.

10. The device of claim 1, wherein the resource allocation related assistance information indicates periodic resources of which at least n resources pertain to resources within the selection window, wherein the processor circuit is arranged to use the resource allocation related assistance information for the at least one resource when the assistance information message is received at any time prior to the trigger.

11. The user device, UE, of claim 1, wherein the processor circuit is arranged to use only information pertaining to resources within a partial overlap of the sensing window and the second sensing window, wherein the processor circuit is arranged to discard information pertaining to resources outside the partial overlap of the sensing window and the second sensing window.

12. The device of claim 1, wherein the resource allocation related assistance information indicates a candidate resource set or a set of specific resources used for transmission, wherein the candidate resource set or a set of specific resources comprises is determined during a second selection window, wherein the processor circuit is arranged to use the assistance information message when the selection window and the second selection window overlap.

13. The device of claim 12, wherein the processor circuit is arranged to use only information pertaining to resources within the partial overlap of the selection window and the second selection window, wherein the processor circuit is arranged to discard information pertaining to resources outside the partial overlap of the selection window and the second selection window.

14. The device of claim 1, wherein an expiry timer is associated with the report or the assistance information message, wherein the processor circuit is arranged to use the assistance information message as long the expiry timer has not expired.

15. The device of claim 14, wherein the timer value of the expiry timer counts down a validity of the assistance information message, wherein the timer value may be in units of OFDM symbols, time slots, subframes, frames, seconds, or milliseconds.

16. The device of claim 15, wherein the expiry timer is paused if the device is in DRX-mode and not receiving.

17. The device of claim 14, wherein the expiry timer is set by the assistance information message, wherein the processor circuit is arranged to obtain the timer value from a control message associated with the assistance information message.

18. The device of claim 17, wherein the processor circuit is arranged to start a timer countdown upon receiving the timer value and the associated the assistance information message, or wherein the processor circuit is arranged to modify the timer value in response to at least one condition and start a modified timer countdown.

19. The device of claim 14, wherein no expiry timer is set, wherein the processor circuit is arranged to start a timer countdown of the expiry timer upon receiving the assistance information message.

20. The device of claim 14, wherein the timer value of the expiry timer depends or is modified based on at least one of the assistance information message, a channel condition, a priority or a Quality of Service, QoS, level of the assistance information message transmission, a resource pool occupation, a resource pool configuration parameter, a distance between the device and the provider of the assistance information message.

21. The device of claim 20, wherein the processor circuit is arranged to set the expiry timer to a time period of the sensing window between a start of the sensing window and the time the assistance information message is received if the timer value of the expiry timer depends or is modified based on the content of the assistance information message, or wherein the processor circuit is arranged to set the expiry timer to the remainder of the selection window, starting from the time the assistance information message is received if the assistance information message comprises a candidate resource set, or wherein the processor circuit is arranged to provide the assistance information message when the timer value of the expiry timer depends or is modified dependent on the channel condition, wherein the processor circuit is arranged to set the timer value to a first value when changes of a channel condition during a certain time period are outside predefined boundaries, wherein the timer value is set to a second value longer than the first value when changes of the channel are within the predefined boundaries, or wherein the processor circuit is arranged to estimate a pathless or a received power of an assistance information message transmission, or wherein the processor circuit is arranged to set the timer value to a first value when the pathless is below a first threshold and/or the received power is above a second threshold, wherein the processor circuit is arranged to set the timer value to a second value shorter than the first value when the pathless is above the first threshold and/or the received power is below the second threshold, or wherein the processor circuit is arranged to determine an aging of a channel, wherein the processor circuit is arranged to reduce the timer value or to increase an increment of the set expiry timer when the age of the channel is at or above a predefined threshold when the timer value of the expiry timer depends or is modified dependent on the priority or the QoS level of the assistance information message transmission, wherein the processor circuit is arranged to set the timer value to a first value when the priority or QoS level is below a threshold, wherein the processor circuit is arranged to set the timer value to a second value shorter than the first value when the priority or QoS level is above the threshold, and/or wherein the processor circuit is arranged to set the timer value to a first value when a resource pool occupation is above a threshold when the timer value of the expiry timer depends or is modified dependent on the resource pool occupation, wherein the processor circuit is arranged to set the timer value to a second value longer than the first value when the resource pool occupation is below the threshold, and/or wherein the processor circuit is arranged to configure the timer value of using a resource pool configuration when the timer value of the expiry timer depends or is modified dependent on the resource pool configuration parameter, and/or wherein the processor circuit is arranged to set the timer value to a first value when a distance between the UE and the further UE is above a threshold when the timer value of the expiry timer depends or is modified dependent on the distance between the UE and the further UE providing the assistance information message, wherein the processor circuit is arranged to set the timer value to a second value shorter than the first value when the distance between the UE and the further UE is below the threshold.

22. The device of claim 14, wherein the processor circuit is arranged to terminate the expiry timer for a first assistance information message when receiving a second assistance information message pertaining to some of all of the resources indicated in the first assistance information message.

23. The device of claim 22, wherein the processor circuit is arranged to terminate the expiry timer for the first assistance information message when the second assistance information message has a hierarchy higher than a hierarchy of the further UE providing the first assistance information message.

24. The device of claim 1, wherein the processor circuit is arranged to not consider a first assistance information message when receiving a second assistance information message pertaining to some of all of the resources indicated in the first assistance information message.

25. The device of claim 24, wherein the processor circuit is arranged to not consider the first assistance information message when the second assistance information message has a hierarchy higher than a hierarchy of the first assistance information message.

26. The device of claim 22, wherein the first assistance information message and the second assistance information message are provided.

27. The device of claim 1, wherein the assistance information message comprises resources for a transmission.

28. The device of claim 1, wherein the processor circuit is arranged to receive the at least one assistance information message at periodic intervals, and/or responsive to a request, and/or responsive to one or more implicit events.

29. The device of claim 1, wherein the processor circuit is arranged to not consider the sensing results during the sensing window in response to receiving at least one assistance information message, wherein the at least one assistance information message comprises sensing results, wherein the processor circuit is arranged to select the resources during the selection window using only the resource allocation related assistance information, wherein the at least one assistance information message comprises the resource allocation related assistance information.

30. The device of claim 1, wherein the processor circuit is arranged to not carry out the sensing procedure during the sensing window in response to receiving the at least one assistance information message, wherein the assistance information message comprises resource allocation related assistance information indicating a candidate resource set or a set of specific resources, wherein the processor circuit is arranged to provide to the higher layers the candidate resource set from the at least one assistance information message for a random resource selection, or select the set of specific resources from the at least one assistance information message.

31. The device of claim 1, wherein the processor circuit is arranged to select the resources during the selection window using the sensing results obtained during the sensing window and the resource allocation related assistance information in response to receiving the at least one assistance information message, wherein the at least one assistance information message comprises the resource allocation related assistance information.

32. The device of claim 1, wherein the resource allocation related assistance information indicates resources available, wherein the indicated resources are in the form of at least one of at least one resources within a resource pool, interference information or a sensing report, wherein the at least one resource within a resource pool are for periodic transmissions.

33. The device of claim 1, wherein the assistance information message indicates the resources, using a list of all resource blocks, wherein the list of all resource blocks are available in one or more time slots, are unavailable in one or more time slots, or have expected collisions.

34. The device of claim 33, wherein the assistance information message indicates the resources across time using a bitmap across time, a starting resource, an explicit resource number or a starting resource, explicit resource numbers, puncturing out resource mentioned explicitly, a starting resource, a pattern of symbols, or using a formula, and or wherein the assistance information message indicates the resources across frequency using a bitmap, using a starting resource, using multiple starting resources, using explicit resource indices, using puncturing out resources mentioned explicitly, using a starting resource, and periodic offsets for subsequent occurrences, using a pattern of resource blocks or subchannels, using a formula used to define the frequency resource indicator value and/or the assistance information message indicates the resources across time and frequency using a matrix, using a pattern, wherein the pattern indicates the resources across time, wherein the matrix indicates the resources across time.

35. The device of claim 1, wherein the processor circuit is arranged to receive the at least one assistance information message one using a configuration message, as a part of a control message as a part of a data transmission, or as an information block.

36. A method of operating a device comprising:

obtaining a candidate resource set for a transmission by selecting resources for the transmission within a selection window following the trigger in response to a trigger for the transmission, wherein the resources are selected by using sensing results obtained during a sensing window preceding the trigger, wherein the sensing results indicate whether resources are available or unavailable for the transmission, receiving at least one report or assistance information message, wherein the reports or assistance information message comprises resource allocation related assistance information, and using a received report or assistance information message for selecting resources for the transmission when one or more predefined conditions are met, wherein the resource allocation related assistance information indicates sensing results during a second sensing window, wherein the processor circuit is arranged to use the assistance information message when the sensing window and the second sensing window overlap.

37. A computer program stored on a non-transitory medium, wherein the computer program when executed on a processor performs the method as claimed in claim 36.

* * * * *